US012073390B2

(12) United States Patent
Unagami

(10) Patent No.: US 12,073,390 B2
(45) Date of Patent: Aug. 27, 2024

(54) DATA DISTRIBUTION METHOD, AUTHENTICATION SERVER, AND DATA STRUCTURE

(71) Applicant: Panasonic Intellectual Property Corporation of America, Torrance, CA (US)

(72) Inventor: Yuji Unagami, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/219,194

(22) Filed: Jul. 7, 2023

(65) Prior Publication Data
US 2023/0351375 A1 Nov. 2, 2023

Related U.S. Application Data

(63) Continuation of application No. 16/526,211, filed on Jul. 30, 2019, now abandoned.
(Continued)

(30) Foreign Application Priority Data

May 27, 2019 (JP) .................................. 2019-098638

(51) Int. Cl.
G06Q 20/38 (2012.01)
G06F 16/182 (2019.01)
(Continued)

(52) U.S. Cl.
CPC ..... G06Q 20/3825 (2013.01); G06F 16/1824 (2019.01); H04L 9/0637 (2013.01);
(Continued)

(58) Field of Classification Search
CPC ................ G06Q 20/3825; G06Q 50/06; G06F 16/1824; G06F 21/44; G06F 21/45;
(Continued)

(56) References Cited

U.S. PATENT DOCUMENTS 10,735,193 B1    8/2020  Knas
2016/0261404 A1*  9/2016  Ford ...................... H04L 67/104
(Continued)

FOREIGN PATENT DOCUMENTS

WO    2018/124297    7/2018

OTHER PUBLICATIONS

Franz et al. ("Secure computations on non-integer values with applications to privacy-preserving sequence analysis", Information Security Technical Report 17 (2013), pp. 117-128 (Year: 2013).*
(Continued)

*Primary Examiner* — James D Nigh
(74) *Attorney, Agent, or Firm* — WENDEROTH, LIND & PONACK, L.L.P.

(57) ABSTRACT

Provided is a data distribution method for a data distribution system which includes a device and a plurality of authentication servers. The data distribution method includes: receiving, by a first authentication server included in the plurality of authentication servers, transaction data including encrypted history information which is history information of the device encrypted using a secure computation method which enables computation without decrypting the encrypted history information; recording, by the first authentication server, the transaction data in a distributed ledger in synchronization with the plurality of authentication servers excluding the first authentication server, when a validity of the transaction data received from the device is verified by the first authentication server; and performing, by the first authentication server, secure computation on the encrypted
(Continued)

history information included in the transaction data, the secure computation being computation processing performed without decrypting the encrypted history information.

13 Claims, 14 Drawing Sheets

Related U.S. Application Data

(60) Provisional application No. 62/714,405, filed on Aug. 3, 2018.

(51) Int. Cl.
| | |
|---|---|
| *H04L 9/00* | (2022.01) |
| *H04L 9/06* | (2006.01) |
| *H04L 9/32* | (2006.01) |
| *G06F 21/44* | (2013.01) |
| *G06F 21/45* | (2013.01) |
| *G06F 21/60* | (2013.01) |
| *G06F 21/62* | (2013.01) |
| *G06F 21/64* | (2013.01) |
| *G06Q 50/06* | (2024.01) |
| *H04L 9/40* | (2022.01) |
| *H04L 67/1095* | (2022.01) |
| *H04W 12/06* | (2021.01) |

(52) U.S. Cl.
CPC ............ *H04L 9/3247* (2013.01); *H04L 9/008* (2013.01); *H04L 9/50* (2022.05); *H04L 2209/46* (2013.01)

(58) Field of Classification Search
CPC .... G06F 21/602; G06F 21/6245; G06F 21/64; H04L 9/0637; H04L 9/3247; H04L 9/008; H04L 9/50; H04L 9/3239; H04L 2200/46; H04L 2200/42; H04L 2200/56; H04L 67/1095; H04L 63/0428; H04L 63/126; H04W 12/06
USPC .......................................................... 705/64
See application file for complete search history.

(56) References Cited

U.S. PATENT DOCUMENTS

| | | | |
|---|---|---|---|
| 2018/0091596 A1 | 3/2018 | Alvarez | |
| 2019/0158594 A1* | 5/2019 | Shadmon | H04L 67/01 |
| 2019/0279160 A1* | 9/2019 | Whitney | H04L 9/0643 |
| 2020/0019963 A1 | 1/2020 | Nakamura | |
| 2020/0034945 A1* | 1/2020 | Soundararajan | H04L 9/3271 |
| 2020/0104636 A1* | 4/2020 | Halevi | G06F 18/211 |
| 2020/0153627 A1* | 5/2020 | Wentz | G06F 21/6218 |
| 2020/0294056 A1* | 9/2020 | Patel | G06F 21/602 |
| 2020/0327250 A1 | 10/2020 | Wang | |
| 2020/0366459 A1* | 11/2020 | Nandakumar | H04L 9/008 |

OTHER PUBLICATIONS

Franz et al., Secure Computations on non-integer values, 2010 IEEE International Workshop on Information Forensics and Security , Sep. 21, 2010, 6 pages (Year: 2010).*
Franz et al., Towards Secure Bioinformatics Services, Springer-Verlag Berlin Heidelberg 2012, pp. 276-283 (Year: 2012).*
Mohassel et al., SecureML: A System for Scalable Privacy-Preserving Machine Learning, from https://eprint.iacr.org/2017396.pdf, 38 pages (Year: 2017).*
Micciancio "Technical Perspective a First Glimpse of Cryptography's Holy Grail", Communications of the ACM, Mar. 2010, vol. 53, No. 3, p. 96 (Year: 2010).*
Gentry "Computing Arbitrary Functions of Encrypted Data", Communications of the ACM, Mar. 2010, vol. 53, No. 3, pp. 97-105 (Year: 2010).*
Doku et al., Pledge: A Private ledger based decentralized data sharing framework, SpringSim-ANSS, Apr. 29-May 2, 2019, Tucson, AZ 2019 Society for Modeling & Simulation International (SCS), May 24, 2019, 11 pages (Year: 2019).*
Yang et al., "Federated Machine Learning: Concept and Applications", ACM Trans. Intell. Syst. Technol., vol. 10, No. 2, Article 12, Feb. 2019, 19 pages (Year: 2019).*
Kazukuni Kobara, "Cyber Physical Security for Industrial Control Systems and IoT", IEICE Transactions on Information and Systems, vol. E99-D, No. 4, Apr. 2016, pp. 787-795.
Daniel Demmler, et al., "ABY—A Framework for Efficient Mixed-Protocol Secure Two-Party Computation", Network and Distributed System Security Symposium, Feb. 2015.
Payman Mohassel, et al., "SecureML: A System for Scalable Privacy-Preserving Machine Learning", from https://eprint.iacr.org/2017/396.pdf, Retrieved Jul. 13, 2018.
Extended European Search Report issued Oct. 11, 2019 in corresponding European Patent Application No. 19189148.0.
Office Action issued May 14, 2021 in corresponding European Patent Application No. 19189148.0.
Wen-jie Lu et al., "Using Fully Homomorphic Encryption for Statistical Analysis of Categorical, Ordinal and Numerical Data", IACR, International Association for Cryptologic Research, vol. 20161228:140542, Dec. 19, 2016, pp. 1-21.
Sei Sato, "Naruhodo IOT Shingijyutu Blockchain", Interface, CQ Publishing Co., Ltd., vol. 44, No. 8, pp. 16-23, Aug. 1, 2018, together with English translation.
Blockchain IoT downloaded from http://pages.cpsc.ucalgary.ca/-joel.reardon/blockchain/readings/blockchain_iot.pdf (Year: 2018).
Towards Blockchain-based Auditable Storage and Sharing of IoT Data https://www.diva-portal.org/smash/get/diva2:1170397/FULLTEXT01.pdf (Year: 2018).

* cited by examiner

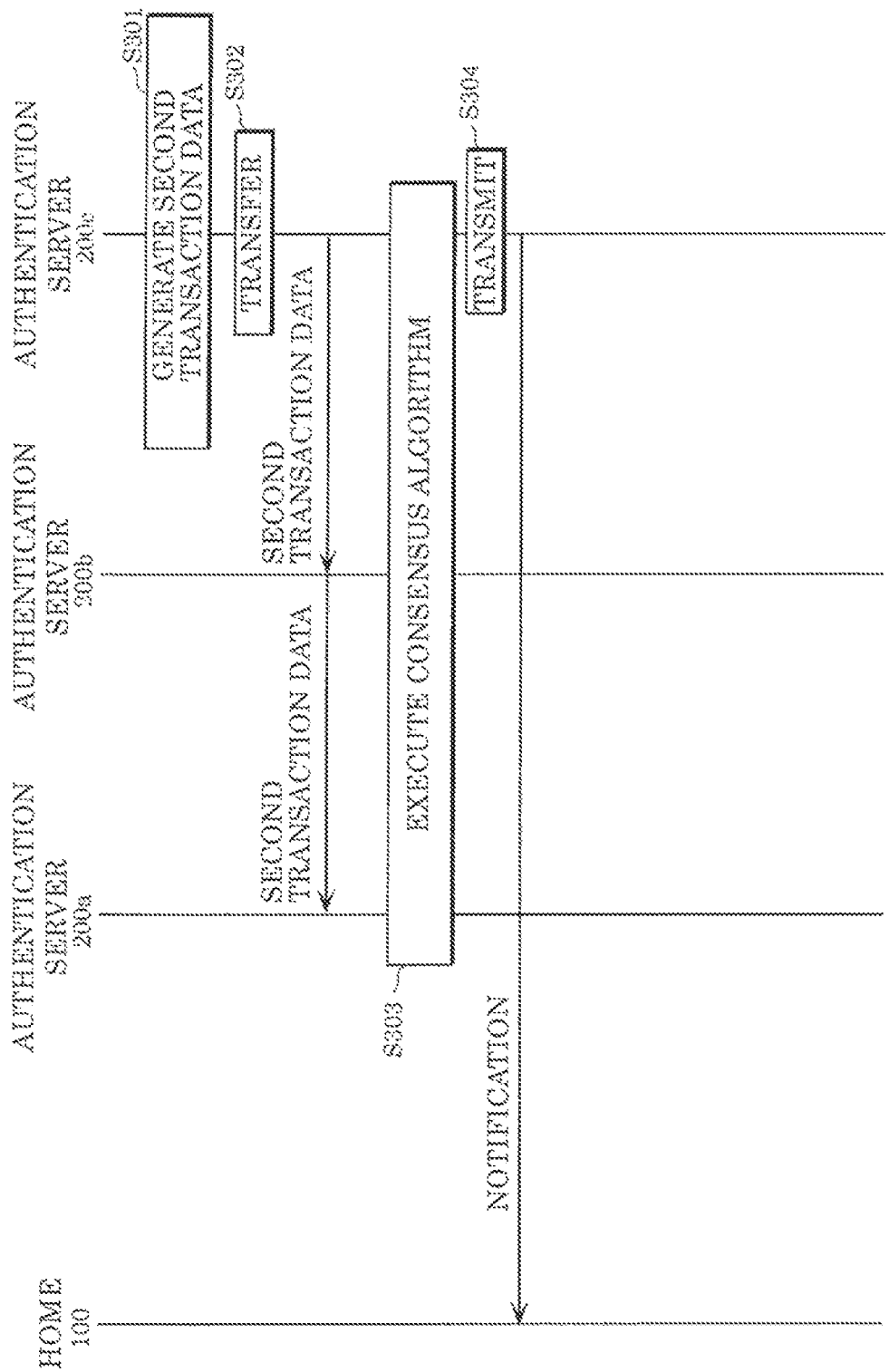

DATA DISTRIBUTION METHOD, AUTHENTICATION SERVER, AND DATA STRUCTURE

BACKGROUND

1. Technical Field

The present disclosure relates to a data distribution method, an authentication server, and a data structure, and relates in particular to a data distribution method, an authentication server, and a data structure for usage of data collected from a user.

2. Description of the Related Art

In recent years, a system that collects, analyzes, and distributes data, such as data on a user and data on a device, has been studied. In the years to come, as the Internet of Things (IoT) advances and artificial intelligence (AI) and the like become popular, it will become possible to collect more data than ever before, so usage of collected data is expected.

However, for usage of collected data, it is important to protect privacy information included in the data. In other words, privacy protection for the data is important.

For example, Non Patent Literature 1 ("Cyber Physical Security for Industrial Control Systems and IoT", IEICE TRANS. INF. & SYST., VOL.E99-D, NO.4 Apr. 2016) (hereinafter referred to as NPL 1) discloses a technology related to security for industrial control systems (ICSs) and IoT. According to NPL 1, it is important to protect not only sensor information but also privacy information related to personal data on health care and wearables, for example.

SUMMARY

However, when the system that collects and distributes data encrypts the collected data before distribution in order to protect the privacy of the collected data, companies and the like that provide services find it difficult to use data that they obtain, since the obtained data is encrypted. On the other hand, if the system distributes the collected data in plain text, the user would not provide data due to the risk of data leakage. As a result, the system cannot collect sufficient data for data usage.

The present disclosure has been conceived in view of the above circumstances, and provides a data distribution method and the related technologies that enable data usage while protecting the privacy of the data.

A data distribution method according to the present disclosure is a data distribution method for a data distribution system which includes a device and a plurality of authentication servers, the data distribution method including: receiving, by a first authentication server included in the plurality of authentication servers, transaction data including encrypted history information which is history information of the device encrypted using a secure computation method which enables computation without decrypting the encrypted history information; recording, by the first authentication server, the transaction data in a distributed ledger in synchronization with the plurality of authentication servers excluding the first authentication server, when a validity of the transaction data received from the device is verified by the first authentication server; and performing, by the first authentication server, secure computation on the encrypted history information included in the transaction data, the secure computation being computation processing performed without decrypting the encrypted history information.

Note that the above general or specific aspect may be realized by a system, an integrated circuit, a computer program, or a computer-readable recording medium such as a compact disc read only memory (CD-ROM), or by any combination of systems, methods, integrated circuits, computer programs, and recording media.

The present disclosure can realize a data distribution method and the related technologies that enable data usage while protecting the privacy of the data.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 is a sequence diagram illustrating token issuance processing according to the embodiment.

DETAILED DESCRIPTION OF EMBODIMENT

Figure 1:
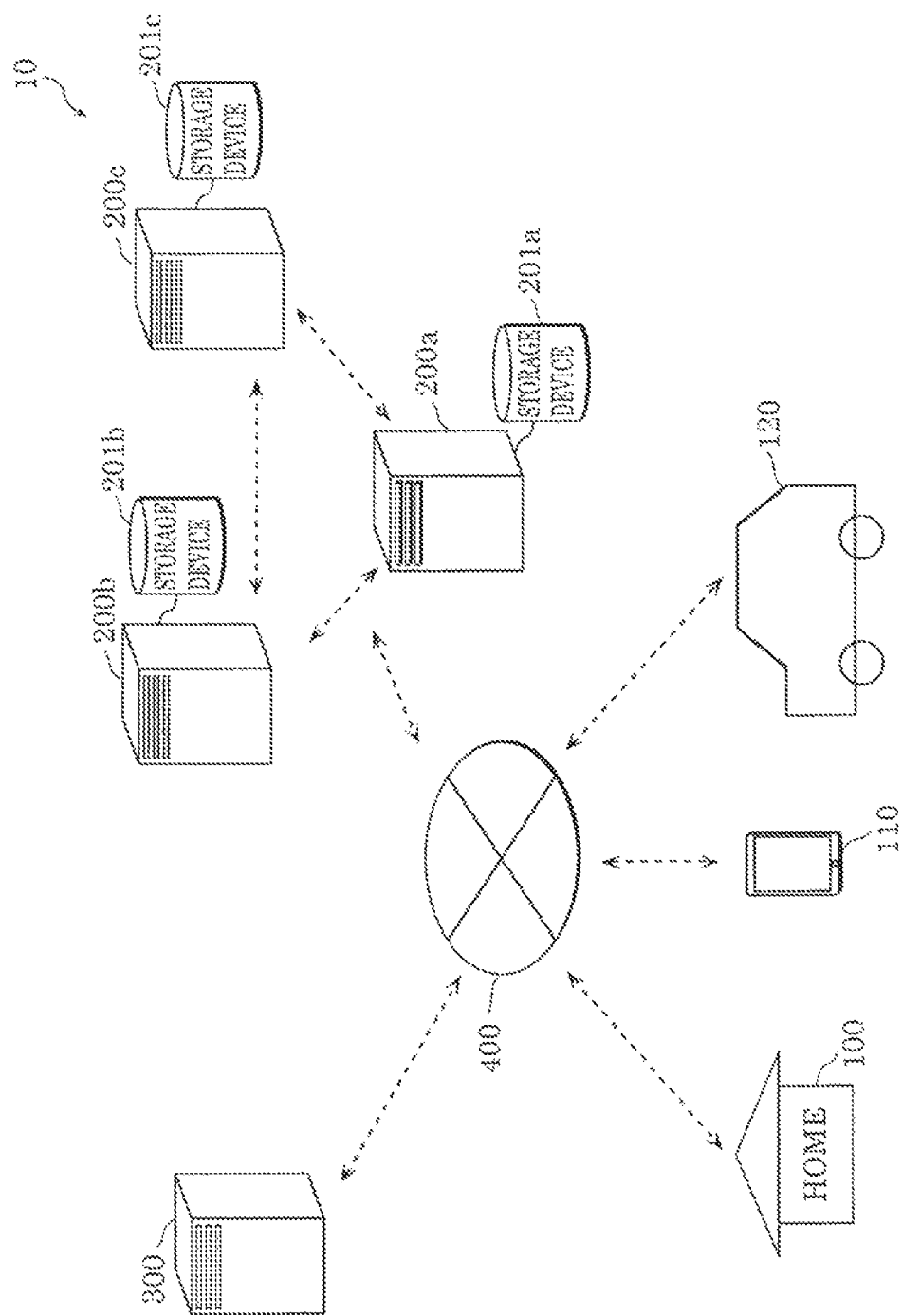
FIG. 1 illustrates an example of the overall configuration of a data distribution system according to an embodiment.

A data distribution method according to an aspect of the present disclosure is a data distribution method for a data distribution system which includes a device and a plurality of authentication servers, the data distribution method including: receiving, by a first authentication server included in the plurality of authentication servers, transaction data including encrypted history information which is history information of the device encrypted using a secure computation method which enables computation without decrypting the encrypted history information; recording, by the first authentication server, the transaction data in a distributed ledger in synchronization with the plurality of authentication servers excluding the first authentication server, when a validity of the transaction data received from the device is verified by the first authentication server; and performing, by the first authentication server, secure computation on the encrypted history information included in the transaction data, the secure computation being computation processing performed without decrypting the encrypted history information.

This makes it possible to realize a data distribution method and the related technologies that enable data usage while protecting the privacy of the data.

The data distribution method may further include: generating, by the first authentication server, second transaction data and transmitting, by the first authentication server, the second transaction data to the plurality of authentication servers excluding the first authentication server, the second transaction data including a blockchain address of, among one or more items of transaction data recorded in the distributed ledger, first transaction data which has been used in the secure computation, the second transaction data indicating that a token has been generated for the blockchain address; and recording, by the first authentication server, the second transaction data in the distributed ledger in synchronization with the plurality of authentication servers excluding the first authentication server.

With this, an incentive can be given when history information of the device is provided.

The data distribution system may further include s a service server, and the data distribution method may further include: generating, by the service server, third transaction data indicating a data analysis request, and transmitting, by the service server, the third transaction data to the first authentication server; recording, by the plurality of authentication servers, the third transaction data in distributed ledgers when a validity of the third transaction data received from the service server is verified by the first authentication server; performing, by the first authentication server, the secure computation on the encrypted history information, and transmitting, by the first authentication server, a computation result of the secure computation to the service server, the encrypted history information being subjected to the computation processing according to the data analysis request and being included in first transaction data among one or more items of transaction data recorded in the distributed ledger; and receiving, by the service server, the computation result of the secure computation from the first authentication server.

This enables usage of the history information of the device while protecting the privacy of the history information.

The data distribution method may further include: generating, by the first authentication server, fourth transaction data which includes a transaction ID of the first transaction data which has been used in the secure computation, and transmitting, by the first authentication server, the fourth transaction data to the plurality of authentication servers excluding the first authentication server, the fourth transaction data indicating that the computation result of the secure computation has been transmitted to the service server; and recording, by the first authentication server, the fourth transaction data in the distributed ledger in synchronization with the plurality of authentication servers excluding the first authentication server.

The history information may include personal data of a user of the device, for example.

The computation processing may include image recognition processing, for example.

An authentication server according to an aspect of the present disclosure is an authentication server in a data distribution system which includes a device and a plurality of authentication servers including the authentication server, the authentication server including: a communication unit configured to receive transaction data including encrypted history information which is history information of the device encrypted using a secure computation method which enables computation without decrypting the encrypted history information; a recorder which records, in a distributed ledger, the transaction data received from the device, when a validity of the transaction data is verified; and a secure computation calculator which performs secure computation on the encrypted history information included in the transaction data, the secure computation being computation processing performed without decrypting the encrypted history information.

A data structure according to an aspect of the present disclosure is a data structure used for a block recorded in a blockchain in a data distribution system which includes a device and a plurality of authentication servers, the data structure including: a blockchain address which is an identifier for identifying a creator of transaction data included in the block of the blockchain; a transaction ID for identifying the transaction data; encrypted history information which is included in the transaction data and is history information of the device encrypted using a secure computation method which enables computation without decrypting the encrypted history information; and an electronic signature of a user of the transaction data, wherein the encrypted history information is used in secure computation performed by a first authentication server included in the plurality of authentication servers, the secure computation processing being computation processing which includes data analysis and is performed without decrypting the encrypted history information.

The following describes an exemplary embodiment with reference to the drawings. Note that the following embodiment shows one specific example of the present disclosure. Therefore, the numerical values, shapes, materials, structural elements, the arrangement and connection of the structural elements, etc. illustrated in the following embodiment are mere examples, and are not intended to limit the present disclosure. Among the structural elements in the following exemplary embodiment, those not recited in any of the independent claims representing how an aspect of the present disclosure is implemented will be described as optional elements. How the present disclosure is implemented is not limited by the current independent claims, and can be represented by other independent claims as well.

Embodiment

First, the following describes a system configuration according to the present disclosure.

[1. System Configuration]

The data distribution system according to the present disclosure includes, into transaction data, encrypted data obtained by encrypting data such as a device's history information, using a method capable of secure computation, and records the transaction data in a distributed ledger. Accordingly, the data distribution system according to the present disclosure can, using the blockchain technology, collect and use data while protecting the privacy of the data.

The following describes the data distribution system and the related technologies according to the embodiment with reference to the drawings.

[1.1 Overall Configuration of Data Distribution System 10]

FIG. 1 illustrates an example of the overall configuration of data distribution system 10 according to the present embodiment.

As illustrated in FIG. 1, data distribution system 10 includes home 100, terminal 110, vehicle 120, authentication servers 200a, 200b, and 200c, and service server 300. These elements are connected via communication network 400.

Authentication servers 200a, 200b, and 200c (hereinafter also referred to as authentication servers 200) are connected with storage devices 201a, 201b, and 201c (hereinafter also referred to as storage devices 201), respectively. Authentication servers 200 may be connected with storage devices 201 via communication network 400, or may internally include storage devices 201. Storage devices 201 each include a distributed ledger for electronically recording a blockchain composed of transaction data blocks.

Note that although FIG. 1 illustrates an example case where data distribution system 10 includes three authentication servers, the number of authentication servers is not limited to three. That is to say, data distribution system 10 may include four or more authentication servers.

[1.2 Configuration of Home 100]

Figure 2:
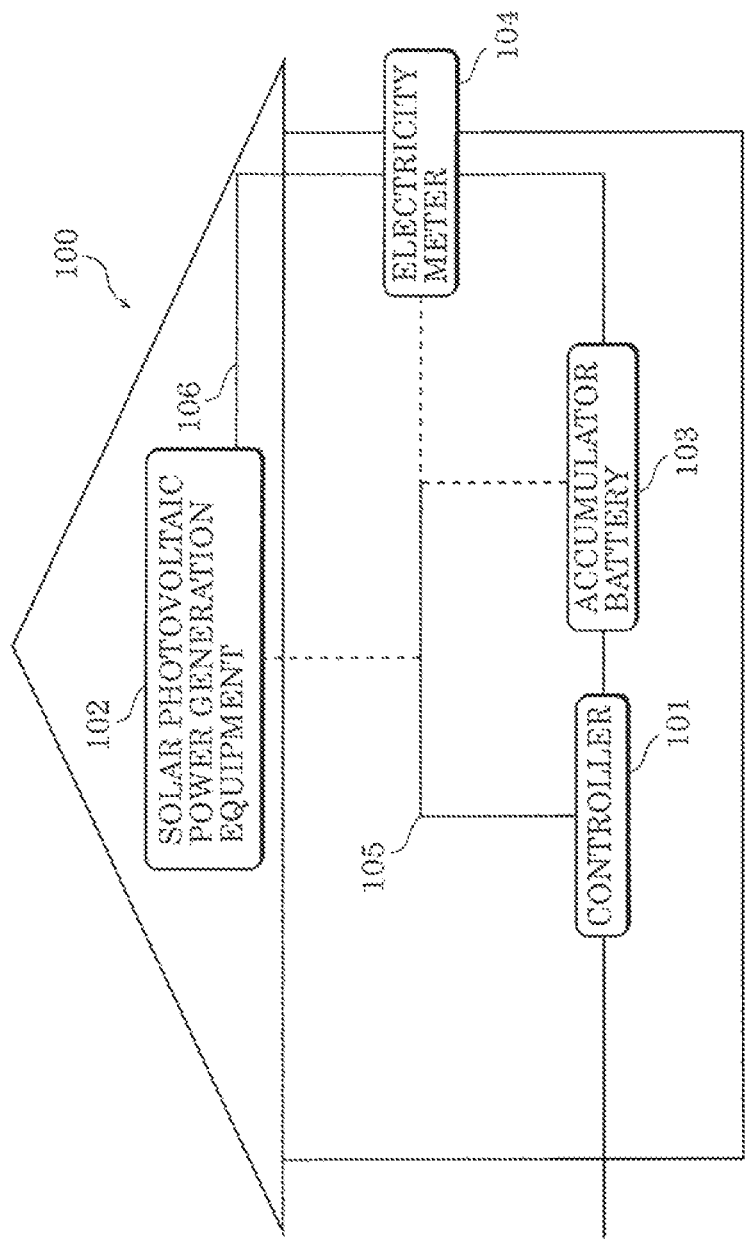
FIG. 2 illustrates an example of the overall configuration of a home according to the embodiment.

FIG. 2 illustrates an example of the overall configuration of home 100 according to the present embodiment.

As illustrated in FIG. 2, home 100 includes controller 101, solar photovoltaic power generation equipment 102, accumulator battery 103, and electricity meter 104. Controller 101, solar photovoltaic power generation equipment 102, accumulator battery 103, and electricity meter 104 are connected via communication network 105. Solar photovoltaic power generation equipment 102, accumulator battery 103, and electricity meter 104 are connected via power network 106. Note that home 100 is, for example, a building such as a house, but is not limited to this. Home 100 may be a building such as a factory. In other words, home 100 may be any building so long as it is used by a user. Hereinafter, a device located at home 100 is called a home device. The home device is an example of a device according to the present disclosure. The home device may include or exclude solar photovoltaic power generation equipment 102, accumulator battery 103, and electricity meter 104. Home 100 may be an example of the device according to the present disclosure.

<Controller 101>

Controller 101 is a controller for an energy management system, for example. In the present embodiment, controller 101 controls solar photovoltaic power generation equipment 102, displays a power generation state of solar photovoltaic power generation equipment 102 and a power accumulation state of accumulator battery 103, and inputs, for example, a request for buying or selling of power. Controller 101 manages the amount of power transmitted to an external power network (not illustrated) via electricity meter 104, and transmits a notification to authentication servers 200. As described, controller 101 controls home devices, displays the states of the home devices, inputs data into the home devices, and manages operation histories and state changes of the home devices.

<Solar Photovoltaic Power Generation Equipment 102>

Solar photovoltaic power generation equipment 102 is an apparatus having a power generation mechanism for directly converting solar light to power using solar battery. Solar photovoltaic power generation equipment 102 uses the generated power at home 100, accumulates the generated power in accumulator battery 103, and transmits the generated power to the power network.

<Accumulator Battery 103>

Accumulator battery 103 accumulates the power generated by solar photovoltaic power generation equipment 102. Accumulator battery 103 transmits the accumulated power to the power network according to a power transmission instruction from controller 101, for example. Accumulator battery 103 may accumulate power received from the power network according to a power reception instruction from controller 101, for example. Note that accumulator battery 103 is not an essential element, and need not be included in home 100.

<Electricity Meter 104>

Electricity meter 104 measures the amount of power transmitted to the external power network or the amount of power received from the external power network. When solar photovoltaic power generation equipment 102 or accumulator battery 103 transmits power to the power network according to a power transmission instruction from controller 101, electricity meter 104 measures the time at which solar photovoltaic power generation equipment 102 or accumulator battery 103 has transmitted the power and the amount of the power transmitted, and notifies controller 101 of the time and the amount measured. Electricity meter 104 measures the amount of power used after power reception from the power network according to a power use instruction from controller 101.

The following describes an example of the configuration of controller 101.

[1.3 Configuration of Controller 101]

Figure 3:
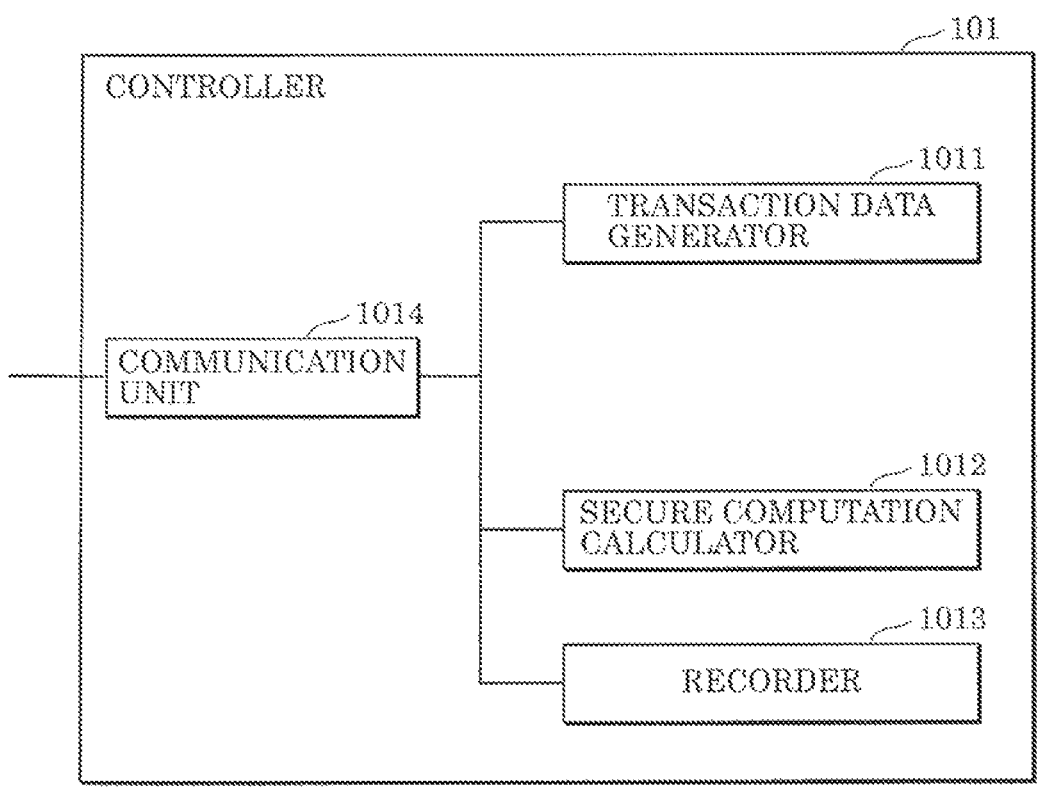
FIG. 3 is a block diagram illustrating an example of the functional configuration of a controller illustrated in FIG. 2.

FIG. 3 is a block diagram illustrating an example of the functional configuration of controller 101 illustrated in FIG. 2.

Controller 101 includes a processor and memory having a program stored therein for causing the processor to execute predetermined processing. In other words, controller 101 is realized as a result of the processor executing a given program using the memory. In the present embodiment, controller 101 includes, as illustrated in FIG. 3, transaction data generator 1011, secure computation calculator 1012, recorder 1013, and communication unit 1014.

<Transaction Data Generator 1011>

When a user controls a home device and transaction data generator 1011 receives a control history from the device or when the state of a home device changes and transaction data generator 1011 receives a state history from the device, transaction data generator 1011 generates transaction data for the blockchain based on history information of the device such as the control history and the state history. Here, the history information of the device is an example of personal data, and includes personal data of the user of the device.

In the present embodiment, transaction data generator 1011 transmits, to secure computation calculator 1012, the history information of the device obtained from the device, and receives, from secure computation calculator 1012, encrypted history information encrypted using a secure computation method which enables computation without decrypting the encrypted history information. Transaction data generator 1011 generates transaction data which includes the encrypted history information received.

Figure 4:
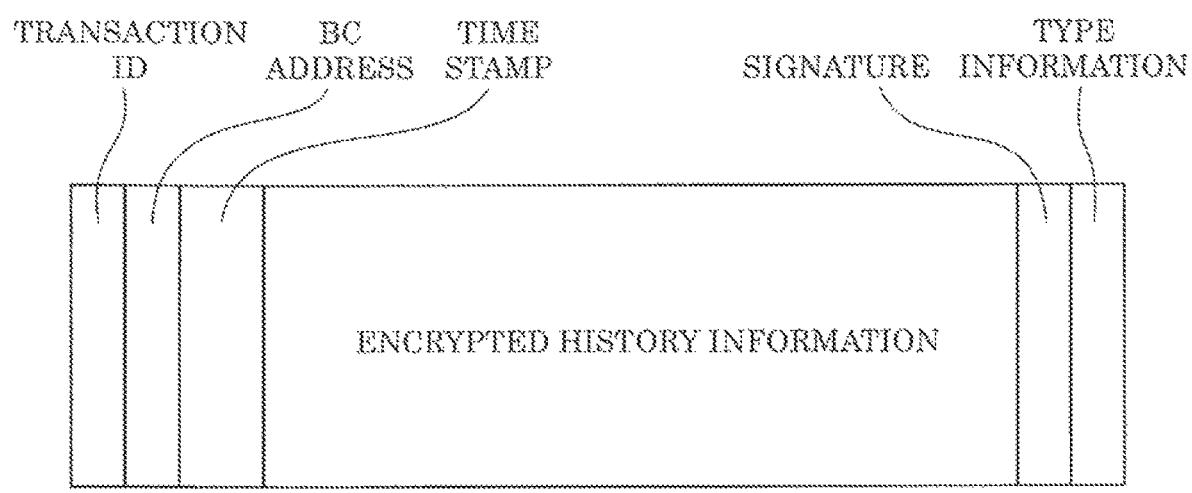
FIG. 4 illustrates an example of the data structure of transaction data according to the embodiment.

Here, with reference to FIG. 4, an example of the structure (data structure) of the transaction data generated by transaction data generator 1011 will be described. FIG. 4 illustrates an example of the data structure of transaction data according to the present embodiment.

As illustrated in FIG. 4, the data structure of the transaction data generated by transaction data generator 1011 includes a transaction ID, a blockchain address, encrypted history information, and a signature. The transaction ID is an identifier for identifying the transaction data. The blockchain address is an identifier for identifying the creator of the transaction data, and is represented as a BC address in FIG. 4. In the present embodiment, the blockchain address enables identification of the user corresponding to the encrypted history information or the controller corresponding to the encrypted history information. The encrypted history information is included in the transaction data, and is data that is history information of a device encrypted using a secure computation method which enables computation without decrypting the encrypted history information. As illustrated in FIG. 4, the encrypted history information is included in the payload portion of the transaction data, that is, the main body of the transaction data. The signature is an electronic signature of the user. In the present embodiment, the signature is generated using a signature generation key unique to the user.

Note that as illustrated in FIG. 4, transaction data generator 1011 may generate transaction data which further includes type information indicating the type of the encrypted history information. The type information indicates, for example, the type of history information (data) constituting the encrypted history information, such as the control history or state history of a home device or the amount of power generated by solar photovoltaic power generation equipment 102.

Transaction data generator 1011 records the generated transaction data in recorder 1013. Furthermore, transaction data generator 1011 transmits the generated transaction data to at least one authentication server 200 among authentication servers 200a, 200b, and 200c via communication unit 1014.

<Secure Computation Calculator 1012>

Secure computation calculator 1012 generates encrypted history information which is history information of a device encrypted using a secure computation method which enables computation without decrypting the encrypted history information. In the present embodiment, secure computation calculator 1012 performs, using a secure computation method, encryption processing on history information of a device received from transaction data generator 1011.

The data on which the encryption processing has been performed using the secure computation method can be subjected to computation processing including image recognition without being decrypted. The encryption processing using the secure computation method can be performed using a method disclosed in Non Patent Literature 2 (NDSS Symposium 2015. "ABY—A Framework for Efficient Mixed-Protocol Secure Two-Party Computation") (hereinafter referred to as NPL 2) or Non Patent Literature 3 ("SecureML: A System for Scalable Privacy-Preserving Machine Learning". Retrieved Jul. 13, 2018, from https://eprint.iacr.org/2017/396.pdf) (hereinafter referred to as NPL 3), for example. In the case of encrypting data using the method disclosed in NPL 2, the four basic arithmetic operations are possible without decrypting the encrypted data. In such a case, statistical data, for example, can be computed without decrypting the encrypted data. In the case of encrypting data using the method disclosed in NPL 3, prediction operations using a neural network are possible. Note that the method used for the encryption processing may be determined in advance, or may be obtained from, for example, authentication data at the time of encryption. More than one method may be used for the encryption processing.

<Recorder 1013>

Recorder 1013 records the transaction data generated by transaction data generator 1011. In the present embodiment, recorder 1013 records the transaction data which has been generated by transaction data generator 1011 and which includes the encrypted history information on which secure computation can be performed.

<Communication Unit 1014>

Communication unit 1014 communicates with service server 300 and authentication servers 200 via communication network 400. The communication may be performed in accordance with transport layer security (TLS). In such a case, communication unit 1014 may hold an encryption key for the TLS communication.

Next, terminal 110 will be described.

[1.4 Configuration of Terminal 110]

Figure 5:
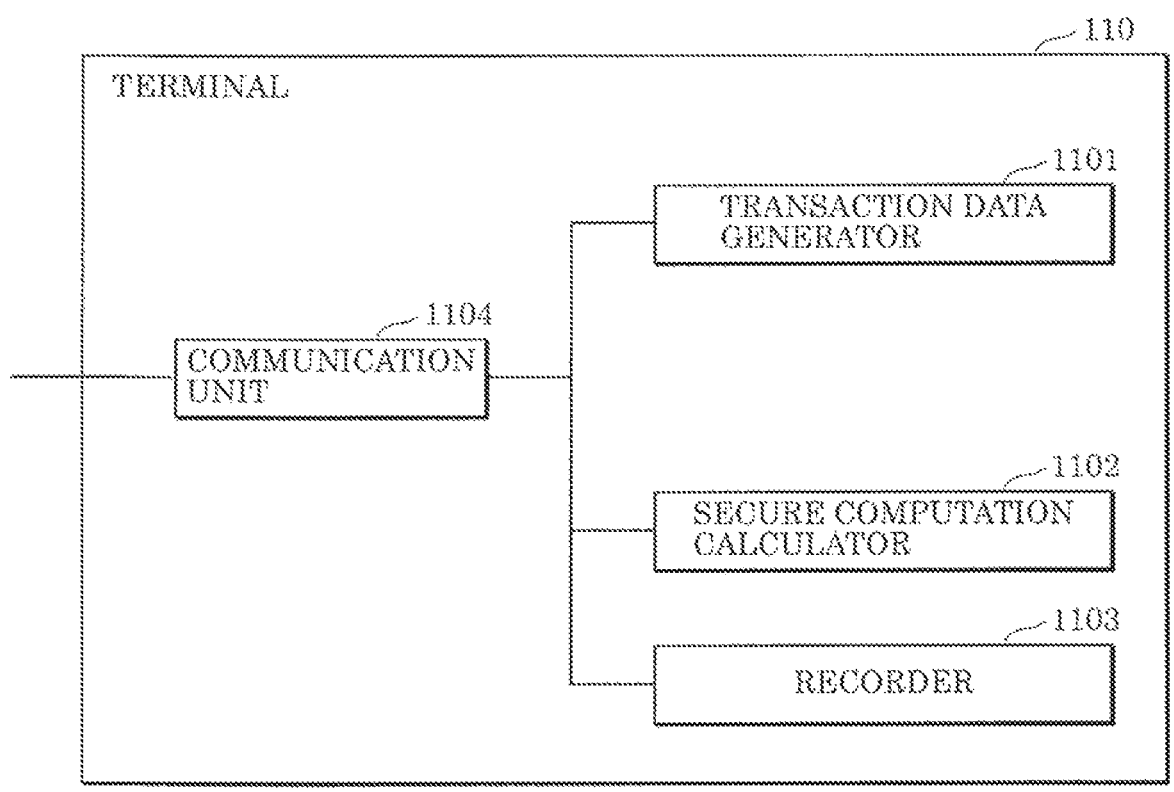
FIG. 5 is a block diagram illustrating an example of the functional configuration of a terminal according to the embodiment.

FIG. 5 is a block diagram illustrating an example of the functional configuration of terminal 110 according to the present embodiment.

Terminal 110 is an example of a device according to the present disclosure, and is realized by a processor executing a given program using memory. Terminal 110 is, for example, a device such as a smartphone including a display and an input unit, or a device such as a wearable device which obtains sensor information of a user.

In the present embodiment, terminal 110 includes, as illustrated in FIG. 5, transaction data generator 1101, secure computation calculator 1102, recorder 1103, and communication unit 1104.

<Transaction Data Generator 1101>

Transaction data generator 1101 generates transaction data for the blockchain based on history information including, for example, a control history of terminal 110 by a user, a history of information entered by the user into terminal 110, and a history of information related to the user collected by terminal 110. The history of information entered by the user into terminal 110 is, for example, a plurality of photos taken by the user in the past using terminal 110. The history of information related to the user collected by terminal 110 is, for example, a history of sensor information such as information indicating the user's body temperature.

In the present embodiment, transaction data generator 1101 transmits, to secure computation calculator 1102, the history information obtained from terminal 110, and receives, from secure computation calculator 1102, encrypted history information encrypted using a secure computation method which enables computation without decrypting the encrypted history information. Transaction data generator 1101 generates transaction data which includes the encrypted history information received.

Here, the structure (data structure) of the transaction data generated by transaction data generator 1101 is as illustrated in FIG. 4. That is to say, the data structure of the transaction data generated by transaction data generator 1101 includes a transaction ID, a blockchain address, encrypted history information, and a signature.

Note that the blockchain address is, as described above, an identifier for identifying the creator of the transaction data, and enables identification of the user or terminal 110. In the same manner as described above, transaction data generator 1101 may generate transaction data which further includes type information indicating the type of the encrypted history information. The type information indicates, for example, the type of history information (data)

constituting the encrypted history information, such as a control history of terminal 110, a plurality of photos taken in the past and held by terminal 110, or a history of sensor information.

Transaction data generator 1101 records the generated transaction data in recorder 1103. Furthermore, transaction data generator 1101 transmits the generated transaction data to at least one authentication server 200 among authentication servers 200a, 200b, and 200c via communication unit 1104.

<Secure Computation Calculator 1102>

Secure computation calculator 1012 generates encrypted history information which is history information of terminal 110 encrypted using a secure computation method which enables computation without decrypting the encrypted history information. In the present embodiment, secure computation calculator 1102 performs encryption processing using a secure computation method on history information of terminal 110 received from transaction data generator 1101 or history information received from transaction data generator 1101 such as a plurality of photos taken in the past and held by terminal 110 or a history of sensor information held by terminal 110. While the description of the details of the encryption processing using a secure computation method is omitted since the details have been described above, a method disclosed in NPL 2 and/or NPL 3, for example, may be used.

Note that the method used for the encryption processing may be determined in advance as described above, or may be obtained from data, for example. More than one method may be used for the encryption processing.

<Recorder 1103>

Recorder 1103 records the transaction data generated by transaction data generator 1101. In the present embodiment, recorder 1103 records the transaction data which has been generated by transaction data generator 1101 and which includes the encrypted history information on which secure computation can be performed.

<Communication Unit 1104>

Communication unit 1104 communicates with service server 300 and authentication servers 200 via communication network 400. The communication may be performed in accordance with TLS. In such a case, communication unit 1104 may hold an encryption key for the TLS communication.

Next, vehicle 120 will be described.

[1.5 Configuration of Vehicle 120]

Vehicle 120 is an automobile, for example, but is not limited to this. Vehicle 120 may be a motorcycle, a ship, or the like. That is to say, vehicle 120 etc. may be any vehicle so long as a plurality of electrical control units (ECUs) are connected to a network in vehicle 120.

Figure 6:
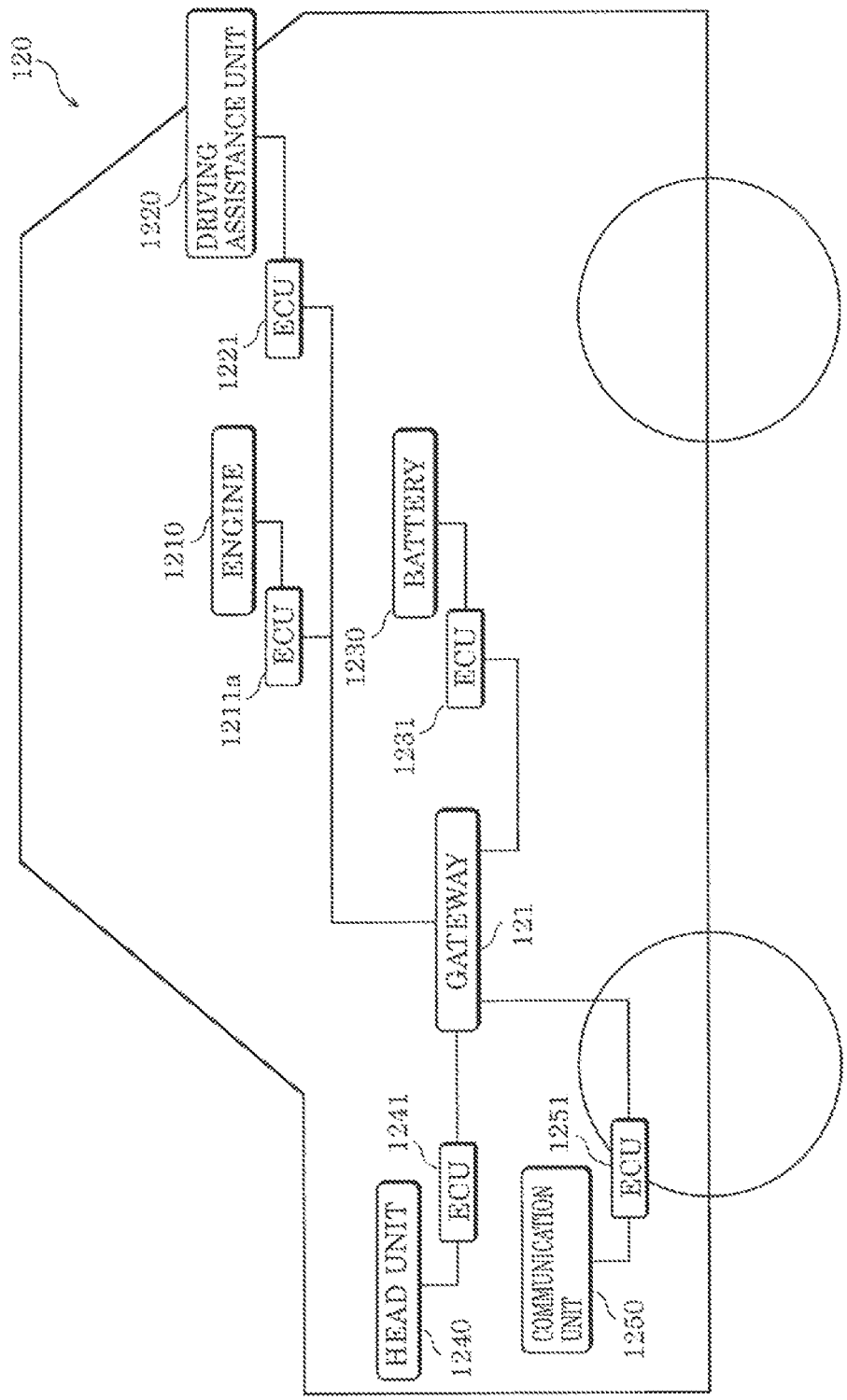
FIG. 6 illustrates an example of the overall configuration of an in-vehicle network system in a vehicle according to the embodiment.

FIG. 6 illustrates an example of the overall configuration of an in-vehicle network system in vehicle 120 according to the present embodiment.

The plurality of electrical control units, namely, ECU 1211a, ECU 1221, ECU 1231, ECU 1241, and ECU 1251 and gateway 121 are connected via the in-vehicle network. Here, the in-vehicle network may be a controller area network (CAN), Ethernet®, or a mixture of CAN and Ethernet®. Note that even when the in-vehicle network includes Ethernet®, a message may be broadcast.

For example, engine 1210, battery 1230, a motor (not illustrated), and a drive ECU related to fuel control are connected to the in-vehicle network. In the example illustrated in FIG. 6, ECU 1211a for engine 1210 and ECU 1231 for battery 1230 are connected to the in-vehicle network.

Driving assistance unit 1220 and a safety and comfort function ECU (not illustrated) such as an automatic brake, lane keeping, inter-vehicle distance function, collision avoidance function, and an airbag are connected to the in-vehicle network. In the example illustrated in FIG. 6, ECU 1221 for driving assistance unit 1220 is connected to the in-vehicle network.

An infotainment ECU such as head unit 1240 is also connected to the in-vehicle network. In the example illustrated in FIG. 6, ECU 1241 for head unit 1240 is connected to the in-vehicle network. Note that ECU 1241 for head unit 1240 need not be included, and head unit 1240 may be directly connected to the in-vehicle network without ECU 1241 in between. The head unit includes a display and an input unit, and has a function to display a screen to, and receive an input of information from, the user present in vehicle 120, i.e., a car.

A communication ECU such as communication unit 1250 having a communication function to communicate with authentication servers 200 is connected to the in-vehicle network. In the example illustrated in FIG. 6, ECU 1251 for communication unit 1250 is connected to the in-vehicle network.

Note that ECU 1211a to ECU 1251 described above may be integrally formed with, that is, configured as one component with, the respective components to which ECU 1211a to ECU 1251 are connected. For example, engine 1210 and ECU 1211a which is for engine 1210 and is connected to engine 1210 may be configured as one component. The same applies to the other ECUs.

These electrical control units, namely, ECU 1211a to ECU 1251, regularly or irregularly transmit a message. For example, ECU 1211a for engine 1210 obtains the number of revolutions of engine 1210, and regularly transmits a message indicating the number of revolutions of engine 1210 obtained. Furthermore, for example, with ECU 1221 for driving assistance unit 1220, when the driving assistance function is turned on, ECU 1221 transmits a message indicating that the driving assistance function is turned on. When a new ECU is connected to the in-vehicle network, a message may be transmitted indicating that a new ECU is connected to the in-vehicle network.

Next, gateway 121 connected to the in-vehicle network will be described.

[1.6 Configuration of Gateway 121]

Figure 7:
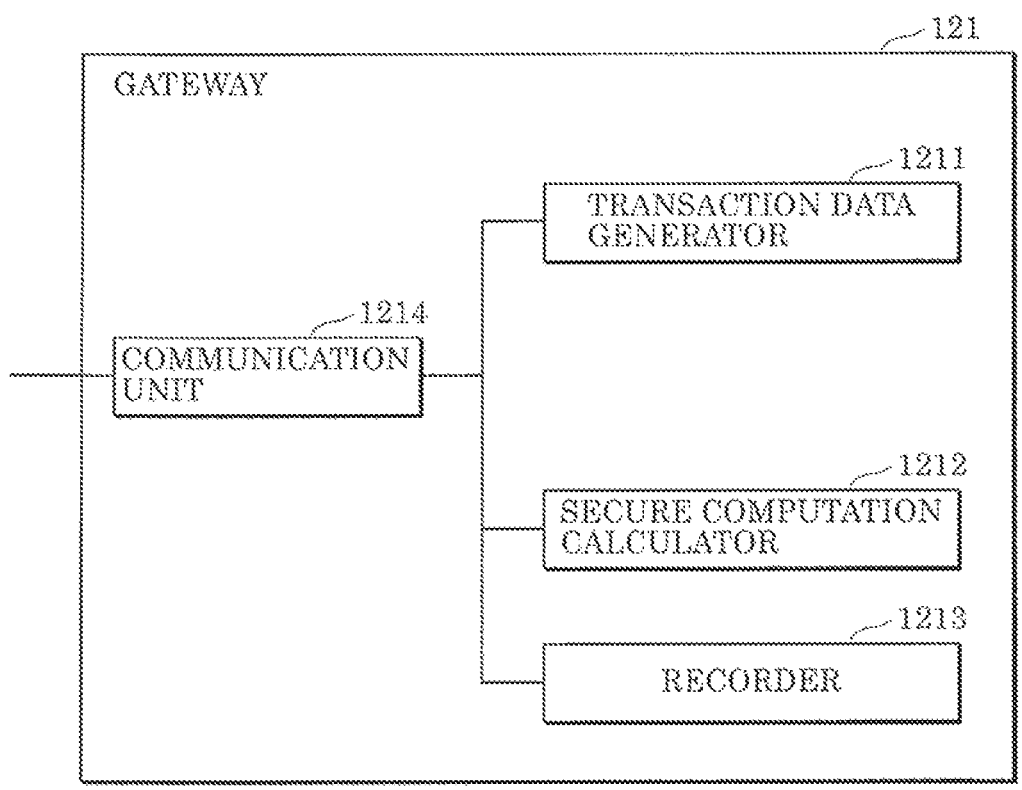
FIG. 7 is a block diagram illustrating an example of the functional configuration of a gateway illustrated in FIG. 5.

FIG. 7 is a block diagram illustrating an example of the functional configuration of gateway 121 illustrated in FIG. 6.

Gateway 121 is realized as a result of a processor executing a given program using memory. In the present embodiment, gateway 121 includes, as illustrated in FIG. 7, transaction data generator 1211, secure computation calculator 1212, recorder 1213, and communication unit 1214.

<Transaction Data Generator 1211>

Transaction data generator 1211 generates transaction data for the blockchain based on history information of vehicle 120 including, for example, a manual driving history or a self-driving history of vehicle 120 and a history of sensor information of vehicle 120.

In the present embodiment, transaction data generator 1211 transmits, to secure computation calculator 1212, the history information obtained from vehicle 120, and receives, from secure computation calculator 1212, encrypted history information encrypted using a secure computation method which enables computation without decrypting the encrypted history information. Transaction data generator 1211 generates transaction data which includes the encrypted history information received.

Here, the structure (data structure) of the transaction data generated by transaction data generator 1211 is as illustrated in FIG. 4. That is to say, the data structure of the transaction data generated by transaction data generator 1211 includes a transaction ID, a blockchain address, encrypted history information, and a signature.

Note that the blockchain address is an identifier for identifying the creator of the transaction data, and enables identification of the user of vehicle 120, gateway 121, or vehicle 120. In the same manner as described above, transaction data generator 1211 may generate transaction data which further includes type information indicating the type of the encrypted history information. The type information indicates, for example, the type of history information (data) constituting the encrypted history information, such as a history of sensor information and a driving history of vehicle 120, e.g., travelling data.

Transaction data generator 1211 records the generated transaction data in recorder 1213. Furthermore, transaction data generator 1211 transmits the generated transaction data to at least one authentication server 200 among authentication servers 200a, 200b, and 200c via communication unit 1214.

<Secure Computation Calculator 1212>

Secure computation calculator 1212 generates encrypted history information which is history information of vehicle 120 encrypted using a secure computation method which enables computation without decrypting the encrypted history information. In the present embodiment, secure computation calculator 1212 performs encryption processing using a secure computation method on history information received from transaction data generator 1211, such as a driving history of vehicle 120 and a history of sensor information. While the description of the details of the encryption processing using a secure computation method is omitted since the details have been described above, a method disclosed in NPL 2 and/or NPL 3, for example, may be used.

<Recorder 1213>

Recorder 1213 records the transaction data generated by transaction data generator 1211. In the present embodiment, recorder 1213 records the transaction data which has been generated by transaction data generator 1211 and which includes the encrypted history information on which secure computation can be performed.

<Communication Unit 1214>

Communication unit 1214 communicates with service server 300 and authentication servers 200 via communication network 400. The communication may be performed in accordance with TLS. In such a case, communication unit 1214 may hold an encryption key for the TLS communication.

Next, authentication server 200a etc. will be described.

[1.7 Configuration of Authentication Server 200a]

Figure 8:
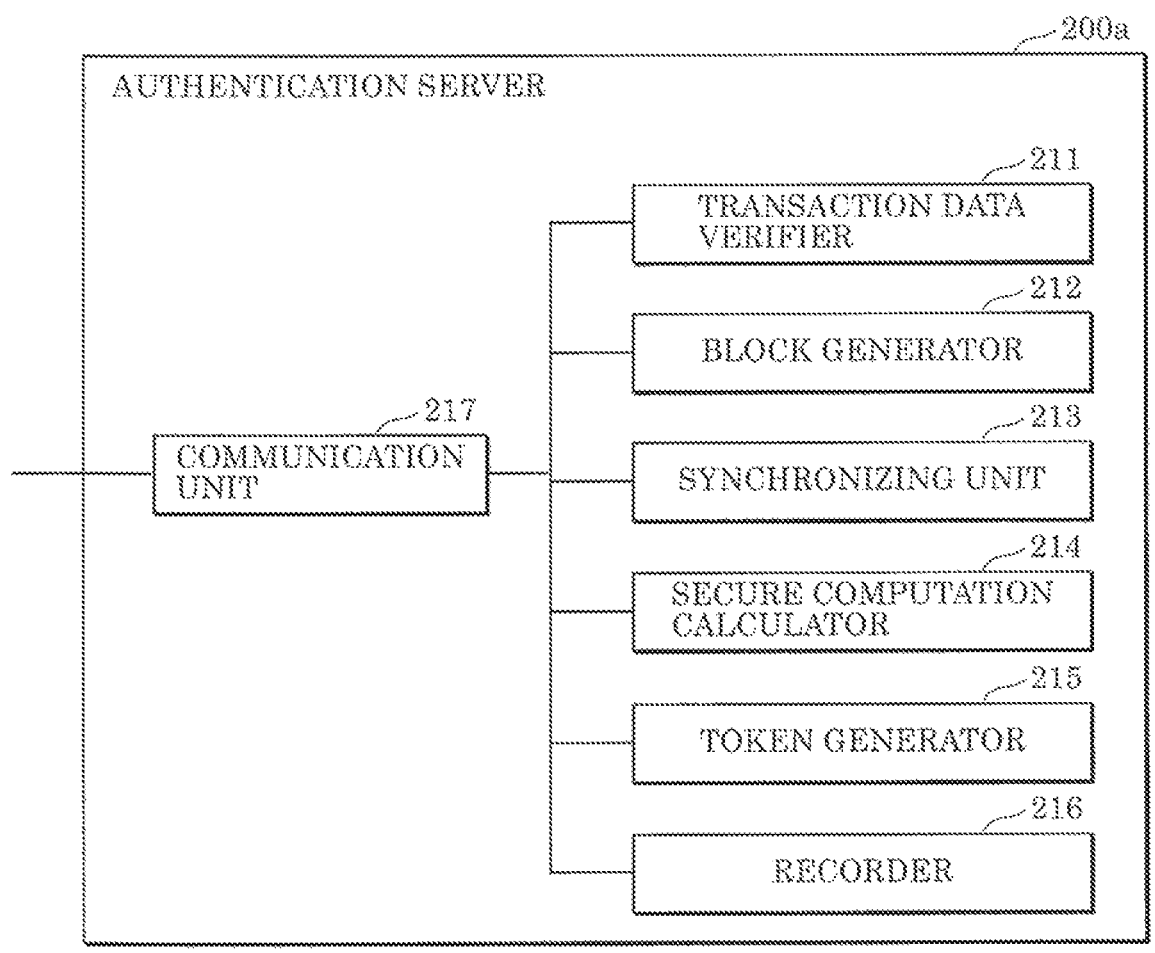
FIG. 8 is a block diagram illustrating an example of the functional configuration of an authentication server according to the embodiment.

FIG. 8 is a block diagram illustrating an example of the functional configuration of authentication server 200a according to the present embodiment. Authentication servers 200b and 200c have the same configuration as authentication server 200a, and thus authentication server 200a is taken as an example in the following description.

As illustrated in FIG. 8, authentication server 200a includes transaction data verifier 211, block generator 212, synchronizing unit 213, secure computation calculator 214, token generator 215, recorder 216, and communication unit 217. Authentication server 200a can be realized as a result of a processor executing a given program using memory. Hereinafter, each structural element will be described.

<Transaction Data Verifier 211>

Transaction data verifier 211 verifies the transaction data received. Specifically, when transaction data verifier 211 receives the transaction data from a device such as home 100, terminal 110, or vehicle 120, transaction data verifier 211 verifies whether the format of the transaction data is proper and whether the signature is valid. By verifying the validity of the received transaction data in such a manner, transaction data verifier 211 verifies the transaction data.

If the result of the verification shows that the transaction data is valid, transaction data verifier 211 records the transaction data in recorder 216 and transfers the transaction data to synchronizing unit 213.

<Block Generator 212>

When the validity of the transaction data is verified successfully by transaction data verifier 211, block generator 212 executes a consensus algorithm related to the transaction data among a plurality of authentication servers. Here, the consensus algorithm may be a consensus algorithm called practical byzantine fault tolerance (PBFT), or any other publicly known consensus algorithm.

In such a manner as described, in the present embodiment, block generator 212 executes the consensus algorithm among authentication servers 200a, 200b, and 200c. Specifically, block generator 212 first generates a block of a blockchain including one or more items of transaction data. Next, block generator 212 executes the consensus algorithm. If a consensus is reached through the execution of the consensus algorithm, block generator 212 records the generated block in recorder 216. The block generated by block generator 212 is recorded by being connected to the blockchain recorded in recorder 216.

Here, a data structure of the blockchain and a data structure of a part of the transaction data included in the blockchain will be described.

Figure 9:
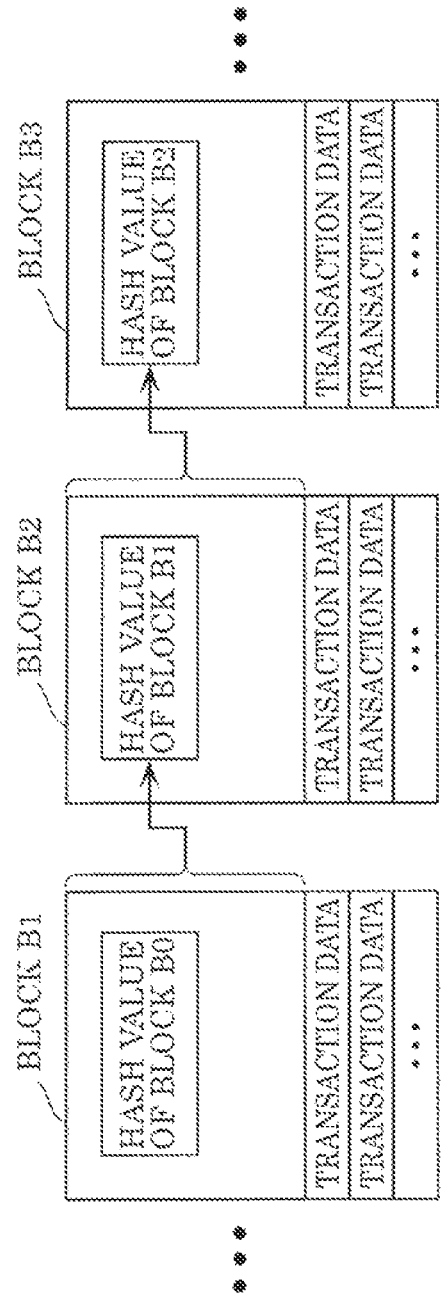
FIG. 9 is an explanatory diagram illustrating the data structure of a blockchain.

FIG. 9 is an explanatory diagram illustrating a data structure of the blockchain.

The blockchain is a chain of blocks each of which is the unit of recording. Each block includes a plurality of items of transaction data and a hash value of the immediately preceding block. Specifically, block B2 includes a hash value of preceding block B1. A hash value calculated based on (i) a plurality of items of transaction data included in block B2 and (ii) the hash value of block B1 is included in block B3 as the hash value of block B2. Connecting blocks like a chain while including the content of the preceding block as a hash value in such a manner effectively prevents tampering with the transaction data included in the connected blocks.

If past transaction data stored in a block of the blockchain is modified, the hash value of the block changes from the hash value before the modification. To make the tampered block look genuine, all the subsequent blocks must be remade, which is very difficult in reality.

<Synchronizing Unit 213>

Synchronizing unit 213 synchronizes the blocks or the transaction data of the blockchain among the plurality of authentication servers (authentication servers 200a to 200c).

Synchronizing units 213 of the plurality of authentication servers 200a to 200c synchronize the transaction data of the blockchain in a peer-to-peer manner. Each synchronizing unit 213 records the synchronized transaction data of the blockchain in recorder 216.

For example, when transaction data verifier 211 verifies the validity of the transaction data, synchronizing unit 213 transfers the verified transaction data to other authentication servers 200$b$ and 200$c$. When synchronizing unit 213 receives the verified transaction data from other authentication servers 200, synchronizing unit 213 records the received, verified transaction data in recorder 216.

<Secure Computation Calculator 214>

Secure computation calculator 214 performs secure computation which is computation processing performed on the encrypted history information included in the transaction data, without decrypting the encrypted history information. More specifically, when secure computation calculator 214 receives a data analysis request from service server 300, secure computation calculator 214 performs secure computation on the encrypted history information. Here, the encrypted history information is subjected to the computation processing according to the data analysis request and is included in first transaction data among one or more items of transaction data recorded in the distributed ledger of storage device 201$a$ in the blockchain. The computation processing in the secure computation performed by secure computation calculator 214 includes data analysis processing such as statistical processing and image recognition processing.

Secure computation calculator 214 then transmits a computation result of the secure computation to service server 300.

For example, when secure computation calculator 214 receives a request from service server 300 to obtain statistical data, secure computation calculator 214 calculates statistical data based on the request, using the transaction data recorded in the distributed ledger of storage device 201$a$. More specifically, secure computation calculator 214 performs, using secure computation, statistical processing on the statistical data of the encrypted history information included in the transaction data. Secure computation calculator 214 then transmits, to service server 300, statistical data obtained through the statistical processing performed using the secure computation. Note that the secure computation may be performed using a method disclosed in NPL 2 and/or NPL 3.

This makes it possible to, for example, calculate a maximum value or an average of the amount of power, analyze photo data held by terminal 110, or predict congestion by calculating an average vehicle speed in a particular region based on the vehicle speed of one or more vehicles 120.

Secure computation calculator 214 transmits, to token generator 215, the blockchain address corresponding to the encrypted history information used in the secure computation.

<Token Generator 215>

Token generator 215 gives an incentive to a user corresponding to the encrypted history information used in the secure computation. In the present embodiment, when token generator 215 receives a blockchain address from secure computation calculator 214, token generator 215 generates transaction data indicating that a token is issued to the blockchain address received. Token generator 215 transmits the generated transaction data to block generator 212 and synchronizing unit 213 to cause synchronizing unit 213 to synchronize with other authentication servers 200 and cause block generator 212 to generate a block. Token generator 215 then notifies home 100, terminal 110, or vehicle 120 indicated by the received blockchain address, that a token has been issued, via communication unit 217.

<Recorder 216>

Recorder 216 includes transaction data into a block, and records the block in the blockchain in the distributed ledger of storage device 201$a$. Storage device 201$a$ may be provided inside recorder 216, or may be provided outside authentication server 200$a$ as illustrated in FIG. 1.

The transaction data includes transaction data received from home 100, terminal 110, or vehicle 120 and transaction data related to the token generated by token generator 215.

In the present embodiment, recorder 216 records, in a distributed ledger, transaction data received from a device, when the validity of the transaction data is verified.

<Communication Unit 217>

Communication unit 217 communicates with home 100, terminal 110, vehicle 120, authentication servers 200$b$ and 200$c$, and service server 300. The communication may be performed in accordance with TLS. In such a case, communication unit 217 may hold an encryption key for the TLS communication. In the present embodiment, communication unit 217 receives transaction data including encrypted history information which is history information of a device encrypted using a secure computation method which enables computation without decrypting the encrypted history information.

Next, service server 300 will be described.

[1.8 Configuration of Service Server 300]

Figure 10:
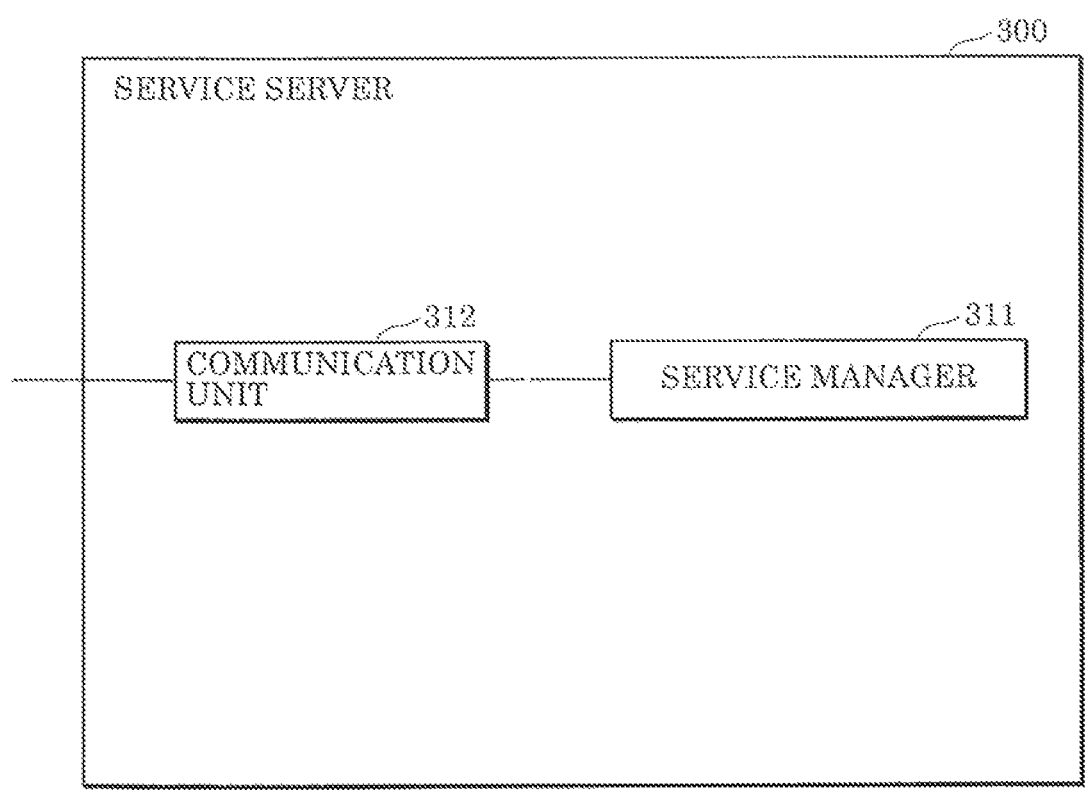
FIG. 10 is a block diagram illustrating an example of the functional configuration of a service server according to the embodiment.

FIG. 10 is a block diagram illustrating an example of the functional configuration of service server 300 according to the present embodiment.

As illustrated in FIG. 10, service server 300 includes service manager 311 and communication unit 312.

<Service Manager 311>

Service manager 311 generates transaction data indicating a data analysis request, and transmits the transaction data to authentication servers 200. For example, when information regarding a device such as home 100, terminal 110, or vehicle 120 is to be used, service manager 311 transmits, to authentication servers 200, a request for provision of statistical data. Here, examples of the statistical data include statistical data indicating a maximum value or an average value of the amount of power at home 100 and statistical data in which objects in a photo taken by terminal 110 are classified into person or scenery. Note that the data analysis request is not limited to the request for provision of statistical data, and also includes a request for provision of image recognition data.

In the present embodiment, service manager 311 generates transaction data including a transaction ID, information indicating the details of the data analysis request, and a signature.

<Communication Unit 312>

Communication unit 312 communicates with authentication servers 200. The communication may be performed in accordance with TLS. In such a case, communication unit 312 may hold an encryption key for the TLS communication.

[1.9 Overall Sequence of Data Distribution Between Home, Authentication Servers, and Service Server]

The following describes a sequence of data distribution between home 100, authentication servers 200$a$ to 200$c$, and service server 300.

Figure 11:
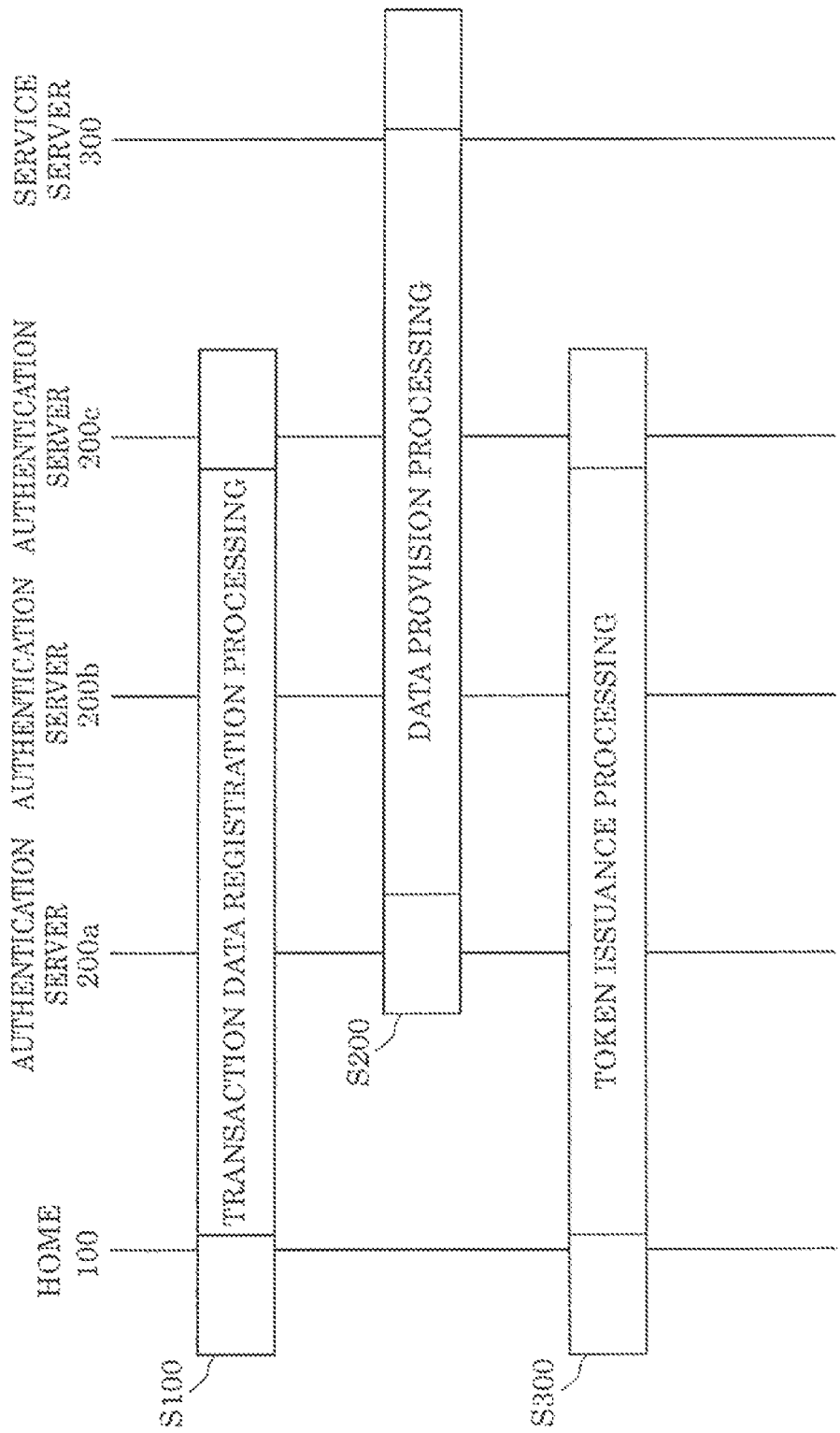
FIG. 11 is an overall sequence diagram illustrating data distribution according to the embodiment.

FIG. 11 is an overall sequence diagram illustrating data distribution according to the present embodiment. Each process will be described below. Note that home 100 illustrated in FIG. 11 may be terminal 110 or vehicle 120. Home 100, terminal 110, and vehicle 120 are examples of a device according to the present disclosure.

First, in Step S100, transaction data registration processing is performed between home 100 and authentication servers 200$a$, 200$b$, and 200$c$. Next, in Step S200, data provision processing is performed between authentication servers 200*a*, 200*b*, and 200*c* and service server 300. Subsequently, in Step S300, token issuance processing is performed between home 100 and authentication servers 200*a*, 200*b*, and 200*c*.

Note that Step S300, that is, the token issuance processing, may be performed every time the data provision processing is performed, or may be performed regularly.

[1.9.1 Transaction Data Registration Processing Between Home and Authentication Servers]

The following describes the transaction data registration processing performed between home 100 and authentication servers 200*a*, 200*b*, and 200*c*.

Figure 12:
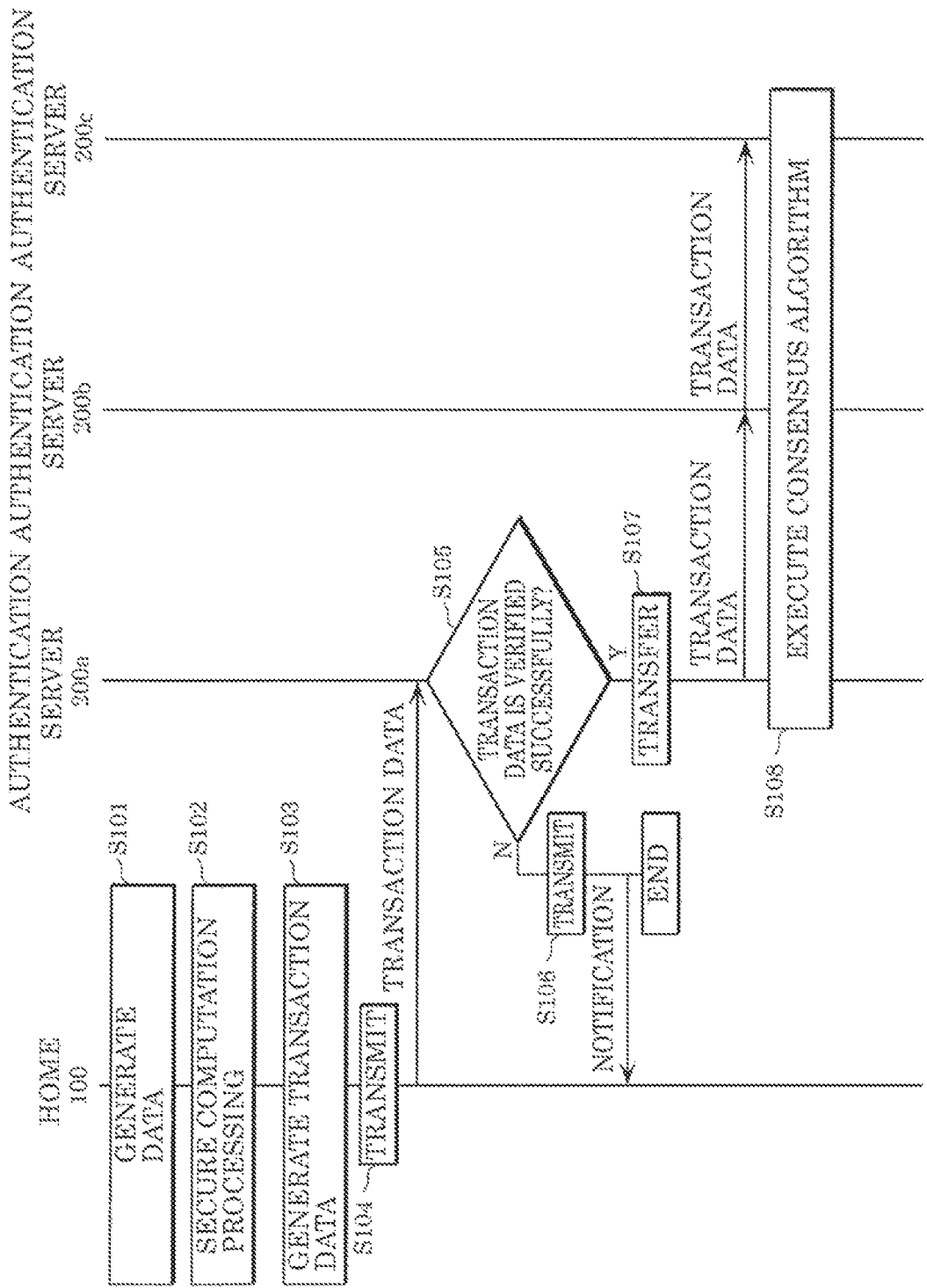
FIG. 12 is a sequence diagram illustrating transaction data registration processing according to the embodiment.

FIG. 12 is a sequence diagram illustrating the transaction data registration processing according to the present embodiment. In FIG. 12, transaction data is registered by home 100 as an example of the device according to the present disclosure; however, the present disclosure is not limited to this. The transaction data may be registered by terminal 110 or vehicle 120. The same sequence applies even when the transaction data is registered by terminal 110 or vehicle 120.

First, in Step S101, controller 101 of home 100 obtains, for example, history information of a home device, and generates data which serves as the base of transaction data. For example, home 100 obtains history information such as a control history of a home device in the home, the amount of power generated by solar photovoltaic power generation equipment 102, or the amount of power output from accumulator battery 103, and generates data which serves as the base of transaction data.

Next, in Step S102, controller 101 of home 100 performs secure computation processing, that is, encryption processing using a secure computation method, on data such as the history information obtained in Step S101. Authentication servers 200*a*, 200*b*, and 200*c* and controller 101 of home 100 may adopt the same secure computation method in advance, or data distribution system 10 may determine a secure computation in advance.

Next, in Step S103, controller 101 of home 100 generates transaction data using the data on which the encryption processing has been performed using a secure computation method in Step S102. More specifically, controller 101 generates transaction data including encrypted history information which is history information of a device encrypted using a secure computation method which enables computation without decrypting the encrypted history information. Here, the transaction data includes a transaction ID, a blockchain address, and a signature, apart from the encrypted history information as described above.

Next, in Step S104, controller 101 of home 100 transmits, to authentication server 200*a*, the transaction data generated in Step S103. Note that in the example illustrated in FIG. 12, controller 101 of home 100 transmits the generated transaction data to authentication server 200*a*; however, controller 101 of home 100 may transmit the generated transaction data to authentication server 200*b* or authentication server 200*c*. This is because the processing is the same even when controller 101 of home 100 transmits the generated transaction data to authentication server 200*b* or authentication server 200*c*.

Next, in Step S105, when authentication server 200*a* receives the transaction data from home 100, authentication server 200*a* verifies the transaction data received.

When the transaction data is not verified successfully in Step S105 (N in S105), authentication server 200*a* transmits a notification to home 100 indicating that the transaction data was not verified successfully (S106), and ends the processing.

On the other hand, when the transaction data is verified successfully in Step S105 (Y in S105), authentication server 200*a* transfers the transaction data to other authentication servers 200 (authentication servers 200*b* and 200*c*) (S107). Note that authentication servers 200*b* and 200*c* also verify the transaction data received.

Next, in Step S108, authentication servers 200*a*, 200*b*, and 200*c* execute a consensus algorithm. When authentication servers 200*a*, 200*b*, and 200*c* verify that the transaction data received is valid transaction data (that is, verify the validity of the transaction data), each of authentication servers 200*a*, 200*b*, and 200*c* generates a block including the transaction data. Then, authentication servers 200*a*, 200*b*, and 200*c* record the blocks including the transaction data in the distributed ledgers of storage devices 201*a*, 201*b*, and 201*c*, respectively. In other words, authentication server 200*a* records the transaction data in the distributed ledger in synchronization with authentication servers 200*b* and 200*c*, that is, authentication servers 200 excluding authentication server 200*a*, when the validity of the transaction data received from home 100 is verified by authentication server 200*a*.

[1.9.2 Data Provision Processing Between Service Server and Authentication Servers]

The following describes data provision processing performed between service server 300 and authentication servers 200*a*, 200*b*, and 200*c*.

Figure 13:
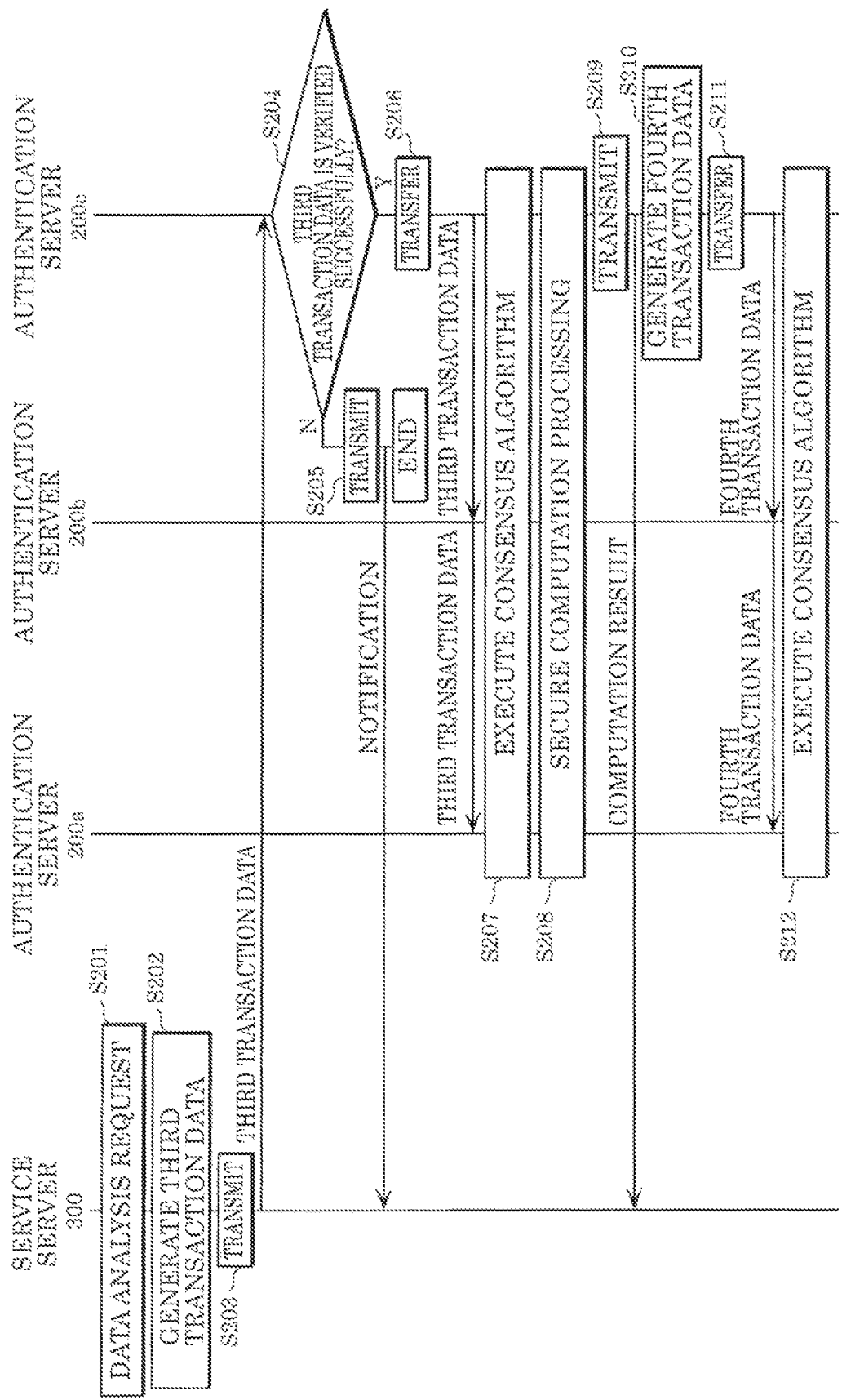
FIG. 13 is a sequence diagram illustrating data provision processing according to the embodiment.

FIG. 13 is a sequence diagram illustrating the data provision processing according to the present embodiment.

First, in Step S201, service server 300 generates a data analysis request. Specifically, service server 300 generates a request for analysis of data such as: statistical data such as an average or a maximum value of power used by home 100; or classification information of photos held by terminal 110.

Next, in Step S202, service server 300 generates transaction data indicating the data analysis request generated in Step S201 (hereinafter referred to as third transaction data). For example, service server 300 generates third transaction data including: a transaction ID indicating service server 300 and identifying transaction data; information indicating the details of the data analysis request; and a signature.

Next, in Step S203, service server 300 transmits, to authentication server 200*c*, the third transaction data indicating the data analysis request generated in Step S202. Note that in FIG. 13, service server 300 transmits the third transaction data to authentication server 200*c*; however, the present disclosure is not limited to this. Service server 300 may transmit the third transaction data to other authentication servers 200 (authentication servers 200*a* and 200*b*). The same sequence applies even when service server 300 transmits the third transaction data to other authentication servers 200.

Next, in Step S204, when authentication server 200*c* receives the third transaction data from service server 300, authentication server 200*c* verifies the third transaction data received.

When the third transaction data is not verified successfully in Step S204 (N in S204), authentication server 200*c* transmits a notification to service server 300 indicating that the third transaction data was not verified successfully (S205), and ends the processing.

On the other hand, when the transaction data is verified successfully in Step S204 (Y in S204), authentication server 200*c* transfers the third transaction data to other authentication servers 200 (authentication servers 200a and 200b) (S206). Other authentication servers 200 also verify the third transaction data received.

Next, in Step S207, authentication servers 200a, 200b, and 200c execute a consensus algorithm. When authentication servers 200a, 200b, and 200c verify that the transaction data received is valid transaction data (that is, verify the validity of the transaction data), each of authentication servers 200a, 200b, and 200c generates a block including the transaction data. Then, authentication servers 200a, 200b, and 200c record the blocks including the transaction data in the distributed ledgers of storage devices 201a, 201b, and 201c, respectively. In other words, when authentication server 200c verifies the validity of the third transaction data received from service server 300, authentication server 200c records the third transaction data in the distributed ledger in synchronization with authentication servers 200a and 200b, that is, authentication servers 200 excluding authentication server 200c.

Next, in Step S208, authentication servers 200a, 200b, and 200c obtain a computation result such as statistical data by performing secure computation processing based on the data analysis request included in the third transaction data received from service server 300. Specifically, authentication servers 200a, 200b, and 200c perform computation processing of secure computation on the encrypted history information. Here, the encrypted history information subjected to the computation processing is included in the first transaction data among one or more items of transaction data recorded in the distributed ledgers. The first transaction data which includes the encrypted history information subjected to the computation processing may be selected based on the type of the data. At this time, the blockchain address of the first transaction data used in the secure computation is recorded.

Note that in Step S208, the computation processing of the secure computation is shared among authentication servers 200a, 200b, and 200c; however, the present disclosure is not limited to this. For example, the computation processing of the secure computation may be performed by authentication server 200c only.

Next, in Step S209, authentication server 200c transmits, to service server 300, a computation result such as statistical data obtained through the secure computation processing performed by authentication servers 200.

Next, in Step S210, authentication server 200c generates transaction data based on the transaction ID of the first transaction data used in the secure computation processing in Step S208 (hereinafter referred to as fourth transaction data). In other words, authentication server 200c generates fourth transaction data which includes the transaction ID of the first transaction data used in the secure computation processing and indicates that the computation result of the secure computation processing has been transmitted to service server 300. The generated fourth transaction data includes the transaction ID of the first transaction data used in the secure computation processing and the signature of authentication server 200c. Note that the signature may be the signature of authentication server 200c only, or may include the signatures of all authentication servers 200 (authentication servers 200a, 200b, and 200c) which have performed the secure computation processing.

Next, in Step S211, authentication server 200c transfers the generated fourth transaction data to other authentication servers 200 (authentication servers 200a and 200b). Other authentication servers 200 also verify the fourth transaction data received.

Next, in Step S212, authentication servers 200a, 200b, and 200c execute a consensus algorithm. When authentication servers 200a, 200b, and 200c verify that the received fourth transaction data is valid transaction data (that is, verify the validity of the fourth transaction data), each of authentication servers 200a, 200b, and 200c generates a block including the fourth transaction data. Then, authentication servers 200a, 200b, and 200c record the blocks including the fourth transaction data in the distributed ledgers of storage devices 201a, 201b, and 201c, respectively. In other words, authentication server 200c records the fourth transaction data in the distributed ledger in synchronization with the plurality of authentication servers 200 excluding authentication server 200c (that is, authentication servers 200a and 200b).

[1.9.3 Token Issuance Processing Between Home and Authentication Servers]

The following describes the token issuance processing performed between the home and the authentication servers.

FIG. 14 is a sequence diagram illustrating the token issuance processing according to the present embodiment. In the example illustrated in FIG. 14, authentication server 200c issues a token; however, the token may be issued by authentication server 200b or authentication server 200a. This is because the processing is the same regardless of whether the token is issued by authentication server 200b or authentication server 200a.

First, in Step S301, authentication server 200c refers to a block including the blockchain address used in the secure computation processing, and extracts the blockchain address. Authentication server 200c then generates transaction data indicating issuance of a token to the blockchain address extracted (hereinafter referred to as second transaction data). In other words, authentication server 200c generates second transaction data which includes a blockchain address of, among one or more items of transaction data recorded in the distributed ledger, the first transaction data used in the secure computation processing, and which indicates that a token has been generated for the blockchain address.

Next, in Step S302, authentication server 200c transfers the second transaction data to authentication servers 200a and 200b. That is to say, authentication server 200c transmits the generated second transaction data to the plurality of authentication servers 200 excluding authentication server 200c. Note that the plurality of authentication servers 200 excluding authentication server 200c, that is, authentication servers 200a and 200b, verify the second transaction data received.

Next, in Step S303, authentication servers 200a, 200b, and 200c execute a consensus algorithm. When authentication servers 200a, 200b, and 200c verify that the received second transaction data is valid transaction data (that is, verify the validity of the second transaction data), each of authentication servers 200a, 200b, and 200c generates a block including the second transaction data. Then, authentication servers 200a, 200b, and 200c record the blocks including the second transaction data in the distributed ledgers of storage devices 201a, 201b, and 201c, respectively. In other words, authentication server 200c records the second transaction data in the distributed ledger in synchronization with the plurality of authentication servers 200 excluding authentication server 200c (that is, authentication servers 200a and 200b).

Next, in Step S304, authentication server 200c transmits, to the blockchain address to which a token has been issued, a notification indicating that a token has been issued. In the example illustrated in FIG. 14, the notification is transmitted to home 100.

[1.10 Advantageous Effects of Embodiment]

In the present embodiment, encrypted data is obtained by encrypting, using a method which enables secure computation, personal data such as history information of a device such as home 100, terminal 110, or vehicle 120. Moreover, in the present embodiment, the encrypted data is included in transaction data, and the transaction data is recorded in a distributed ledger. This makes it possible to, not only effectively reduce tampering with the encrypted data, but also protect the privacy without leakage of the personal data even when the transaction data included in a block in a blockchain is made public. Moreover, with use of the secure computation, the personal data included in the transaction data can be used without being decrypted.

As a result, since the user's privacy is protected even when the user provides personal data, the user can more easily provide personal data. That is to say, the user can more easily provide authentication servers 200 with transaction data which includes encrypted data that is encrypted using a method capable of secure computation. Moreover, since a token is issued when the transmitted transaction data is used, the user, too, has a merit in providing personal data. That is to say, an incentive can be given to the user for providing personal data.

In such a manner, even when authentication servers 200 make the distributed ledgers public, the privacy of personal data can be protected, and usage of the personal data is possible. That is to say, with use of the blockchain technology, it is possible to configure a safe system capable of, not only effective reduction of tampering with personal data, but also usage of the personal data while protecting the privacy of the personal data.

[2. Other Variations]

Although the present disclosure has been described based on the above embodiment, the present disclosure is not limited to the above embodiment. Such cases as below are also encompassed by the present disclosure.

(1) In the above embodiment, authentication servers 200 and service server 300 have been described as different devices; however, authentication servers 200 and service server 300 may be one and the same device.

(2) In the above embodiment, when the verification of transaction data has failed, authentication server 200 notifies home 100, terminal 110, or vehicle 120 of the failure; however, authentication server 200 may also notify service server 300 of the failure.

(3) In the above embodiment, authentication server 200 issues a token to a blockchain address used in the secure computation processing; however, a token held by service server 300 may be transmitted to the blockchain address. Moreover, service server 300 may request authentication server 200 to issue a token, and may transmit the issued token to the blockchain address.

(4) In the above embodiment, authentication server 200 issues a token; however, a token or virtual currency issued outside data distribution system 10 may be held by storage device 201 etc. of authentication server 200 in advance and may be transmitted to the blockchain address.

(5) A plurality of authentication servers 200 may collaboratively perform the secure computation processing as described in the above embodiment. Alternatively, one authentication server 200 may perform the secure computation processing based on an existing secure computation encryption method. Here, authentication server 200 which has performed the secure computation processing may generate a token, or other authentication servers 200 which did not perform the secure computation processing may generate a token.

(6) In the above embodiment, authentication server 200 issues a token to the blockchain address used in the secure computation processing; however, a token may be issued to a device such as home 100, terminal 110, or vehicle 120 which has registered the transaction data in the transaction data registration processing. This may lead to registration of more items of transaction data.

(7) In the above embodiment, the encryption processing performed through secure computation may employ a plurality of encryption methods. This makes it possible to support various types of computations, such as computations of statistical data or computations in prediction processing for machine learning.

(8) In the above embodiment, a token is issued to the blockchain address used in the secure computation processing. The unit of token issuance may be set such that one token is issued when a blockchain address is used for the secure computation processing once. If a blockchain address is used for the secure computation processing more than once, one token may be issued for each use, or a plurality of tokens may be collectively issued for a large number of uses. With this, the incentive to the user can be increased when a lot of personal data has been provided to service server 300.

(9) In the above embodiment, when generating transaction data for home 100, terminal 110, and vehicle 120, encrypted history information encrypted through the secure computation is included in the transaction data; however, the present disclosure is not limited to this. Rather than including the encrypted history information itself, the transaction data may include history identification information for identifying the encrypted history information. In such a case, the encrypted history information may be recorded in the recorder of authentication server 200, and may be held by one or more authentication servers 200 among the plurality of authentication servers 200.

(10) In addition, the present disclosure also encompasses a data structure used for a block recorded in the blockchain in data distribution system 10 according to the above embodiment. More specifically, a data structure according to the present disclosure includes: a blockchain address which is an identifier for identifying a creator of transaction data included in the block of the blockchain; a transaction ID for identifying the transaction data; encrypted history information which is included in the transaction data and is history information of the device encrypted using a secure computation method which enables computation without decrypting the encrypted history information; and an electronic signature of a user of the transaction data. The encrypted history information included in the data structure according to the present disclosure is used in the secure computation processing performed by a first authentication server included in the plurality of authentication servers 200. Here, the secure computation processing is computation processing which includes data analysis and is performed without decrypting the encrypted history information.

(11) Each of the devices according to the above embodiment is, specifically, a computer system including a microprocessor, read-only memory (ROM), random-access memory (RAM), a hard disk unit, a display unit, a keyboard, a mouse, etc. A computer program is recorded in the RAM or the hard disk unit. Each of the devices achieves its function as a result of the microprocessor operating according to the computer program. Here, the computer program is configured by combining a plurality of instruction codes indicating instructions for the computer in order to achieve a given function.

(12) A portion or all of the structural elements of each device according to the above embodiment may be configured from one system large-scale integration (LSI). A system LSI is a super-multifunction LSI manufactured with a plurality of components integrated on a single chip, and specifically is a computer system including a microprocessor, ROM, and RAM, for example. A computer program is recorded in the RAM. The system LSI achieves its function as a result of the microprocessor operating according to the computer program.

Each structural element of each of the devices described above may be implemented in a single chip individually, or in a single chip that includes some or all of them.

The name used here is system LSI, but it may also be called integrated circuit (IC), LSI, super LSI, or ultra LSI depending on the degree of integration. Moreover, the method of circuit integration is not limited to LSI. Integration may be realized with a specialized circuit or a general purpose processor. After manufacturing the LSI circuit, a field programmable gate array (FPGA) or a reconfigurable processor that allows reconfiguration of the connection or setting of the inner circuit cells of the LSI circuit can be used.

Furthermore, when advancement in semiconductor technology or derivatives of other technologies brings forth a circuit integration technology which replaces LSI, it will be appreciated that such a circuit integration technology may be used to integrate the functional blocks. Application of biotechnology is one such possibility.

(13) A portion or all of the structural elements of each of the devices described above may each be configured as an IC card that is detachably attached to each device, or as a stand-alone module. The IC card and the module are computer systems configured from a microprocessor, ROM, and RAM, for example. The IC card and the module may also include the super-multifunction LSI described above. The IC card and the module achieve their function as a result of the microprocessor operating according to a computer program. The IC card and the module may be tamperproof.

(14) The present disclosure may be realized as the methods described above. The present disclosure may be a computer program realizing these methods using a computer, or a digital signal including the computer program.

Furthermore, the present disclosure may also be realized as the computer program or the digital signal recorded on a computer-readable recording medium such as a flexible disk, hard disk, CD-ROM, a magneto-optical disk (MO), a digital versatile disc (DVD), DVD-ROM, DVD-RAM, a Blu-ray disc (BD), or a semiconductor memory. The present disclosure may also be realized as the digital signal recorded on these recording media.

Moreover, the present disclosure may also be realized by transmitting the computer program or the digital signal via, for example, an electric communication line, a wireless or wired communication line, a network such as the Internet, or data broadcasting.

Moreover, the present disclosure may be realized as a computer system including (i) memory having the computer program recorded thereon, and (ii) a microprocessor that operates according to the computer program.

Moreover, the computer program or the digital signal may be realized by an independent computer system by being recorded on the recording medium and transmitted, or by being transmitted via the network, for example.

(15) The above embodiment and each of the above variations may be combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

In a data distribution system according to the present disclosure, history information of a device is transmitted after being encrypted using a secure computation method, and authentication servers compute data without decrypting the encrypted history information. This enables usage of data while protecting the privacy of the data.

What is claimed is:

1. A data distribution method for a data distribution system which includes a device and a plurality of authentication servers, the data distribution method comprising:
  encrypting, by the device, history information of the device, the device encrypting the history information using a first secure computation method which enables computation without decrypting the encrypting history information;
  generating, by the device, transaction data including the encrypted history information;
  transmitting, by the device, the transaction data to a first authentication server included in the plurality of authentication servers;
  receiving, by the first authentication server, the transaction data;
  recording, by the first authentication server, the transaction data in a distributed ledger in synchronization with the plurality of authentication servers excluding the first authentication server;
  receiving, by the first authentication server, a request for data analysis from a service server;
  performing, by the first authentication server using a second secure computation method, secure computation on the encrypted history information included in the transaction data, which is stored in the distributed ledger, when the request for data analysis is received from the service server, the secure computation being computation processing performed without decrypting the encrypted history information;
  transmitting, by the first authentication server, a computation result of the second secure computation to the service server;
  generating, by the first authentication server, second transaction data;
  transmitting, by the first authentication server, the second transaction data to the plurality of authentication servers excluding the first authentication server, the second transaction data indicating that a token has been generated for a user or the device corresponding to the encrypted history information used in the second secure computation; and recording, by the first authentication server, the second transaction data in the distributed ledger in synchronization with the plurality of authentication servers excluding the first authentication server.

2. The data distribution method according to claim 1, wherein
the second transaction data includes a blockchain address of, among one or more items of transaction data recorded in the distributed ledger, first transaction data which has been used in the second secure computation, the second transaction data indicating that the token has been generated for the blockchain address, and
the blockchain address enables identification of the user or the device corresponding to the encrypted history information used in the second secure computation.

3. The data distribution method according to claim 1, further comprising:
generating, by the first authentication server, third transaction data and transmitting, by the first authentication server, the third transaction data to the plurality of authentication servers excluding the first authentication server, the third transaction data indicating that a second token has been generated for the user or the device corresponding to the history information used in the first secure computation; and
recording, by the first authentication server, the third transaction data in the distributed ledger in synchronization with the plurality of authentication servers excluding the first authentication server.

4. The data distribution method according to claim 3, wherein
the third transaction data is generated when the computation result of the second secure computation is transmitted to the service server.

5. The data distribution method according to claim 1, wherein
the data distribution system further includes the service server,
the data distribution method further comprising:
generating, by the service server, fourth transaction data indicating a data analysis request, and transmitting, by the service server, the fourth transaction data to the first authentication server;
recording, by the plurality of authentication servers, the fourth transaction data in distributed ledgers when a validity of the fourth transaction data received from the service server is verified by the first authentication server; and
receiving, by the service server, the computation result of the secure computation from the first authentication server, and
in the performing the secure computation on the encrypted history information, the encrypted history information is subjected to the computation processing according to the data analysis request and is included in first transaction data among one or more items of transaction data recorded in the distributed ledger.

6. The data distribution method according to claim 3, further comprising:
generating, by the first authentication server, fifth transaction data which includes a transaction ID of the first transaction data which has been used in the secure computation, and transmitting, by the first authentication server, the fifth transaction data to the plurality of authentication servers excluding the first authentication server, the fifth transaction data indicating that the computation result of the secure computation has been transmitted to the service server; and
recording, by the first authentication server, the fifth transaction data in the distributed ledger in synchronization with the plurality of authentication servers excluding the first authentication server.

7. The data distribution method according to claim 1, wherein
the history information includes personal data of a user of the device.

8. The data distribution method according to claim 1, further comprising:
performing processing, by the first authentication server, to verify a validity of the transaction data received from the device; and
recording, by the first authentication server, the transaction data in a distributed ledger in synchronization with the plurality of authentication servers, when the validity of the transaction data received from the device is verified by the first authentication server.

9. The data distribution method according to claim 1, further comprising:
generating, by the first authentication server, a notification indicating that the token has been issued; and
transmitting, by the first authentication server, the notification to the device indicated by the blockchain address.

10. The data distribution method according to claim 1, wherein
the first secure computation method being an encryption method using one of fully homomorphic encryption and multi-party computation, and
the second secure computation method being the encryption method using the one of fully homomorphic encryption and multi-party computation.

11. The data distribution method according to claim 1, wherein
the computation processing being one of statistical processing and predictive computation processing using a neural network.

12. The data distribution method according to claim 11, wherein
the computation result includes statistical data obtained through the statistical processing.

13. A data distribution system comprising:
a device; and
a plurality of authentication servers including a first authentication server,
wherein the device:
encrypts history information of the device, the device encrypting the history information using a first secure computation method which enables computation without decrypting the encrypting history information;
generates transaction data including the encrypted history information; and
transmits the transaction data to the first authentication server, and
wherein the first authentication server:
receives the transaction data;
records the transaction data in a distributed ledger in synchronization with the plurality of authentication servers excluding the first authentication server;

receives a request for data analysis from a service server;

performs, using a second secure computation method, secure computation on the encrypted history information included in the transaction data, which is stored in the distributed ledger, when the request for data analysis is received from the service server, the secure computation being computation processing performed without decrypting the encrypted history information;

transmits a computation result of the second secure computation to the service server;

generates second transaction data;

transmits the second transaction data to the plurality of authentication servers excluding the first authentication server, the second transaction data indicating that a token has been generated for a user or the device corresponding to the encrypted history information used in the second secure computation; and records the second transaction data in the distributed ledger in synchronization with the plurality of authentication servers excluding the first authentication server.

\* \* \* \* \*